United States Patent
Niu et al.

(10) Patent No.: US 11,071,149 B2
(45) Date of Patent: Jul. 20, 2021

(54) MULTEFIRE DESIGN OF RANDOM ACCESS CHANNEL AND RANDOM ACCESS CHANNEL PROCEDURE FOR INTERNET OF THINGS DEVICE OPERATION IN UNLICENSED SPECTRUM

(71) Applicant: Intel IP Corporation, Santa Clara, CA (US)

(72) Inventors: Huaning Niu, Milpitas, CA (US); Wenting Chang, Beijing (CN); Qiaoyang Ye, San Jose, CA (US); Salvatore Talarico, Sunnyvale, CA (US); Jinnian Zhang, Madison, WI (US)

(73) Assignee: Apple Inc., Cupertino, CA (US)

( * ) Notice: Subject to any disclaimer, the term of this patent is extended or adjusted under 35 U.S.C. 154(b) by 105 days.

(21) Appl. No.: 16/604,047

(22) PCT Filed: May 3, 2018

(86) PCT No.: PCT/US2018/030872
§ 371 (c)(1),
(2) Date: Oct. 9, 2019

(87) PCT Pub. No.: WO2018/204629
PCT Pub. Date: Nov. 8, 2018

(65) Prior Publication Data
US 2021/0105821 A1 Apr. 8, 2021

Related U.S. Application Data

(60) Provisional application No. 62/501,884, filed on May 5, 2017, provisional application No. 62/526,205, filed on Jun. 28, 2017.

(51) Int. Cl.
*H04W 4/00* (2018.01)
*H04W 74/08* (2009.01)
(Continued)

(52) U.S. Cl.
CPC ......... *H04W 74/0833* (2013.01); *G16Y 10/75* (2020.01); *H04W 4/70* (2018.02); *H04W 72/0406* (2013.01)

(58) Field of Classification Search
CPC .............. H04W 74/0833; H04W 4/70; H04W 72/0406; G16Y 10/75
(Continued)

(56) References Cited

U.S. PATENT DOCUMENTS 9,014,143 B2    4/2015   Damnjanovic et al.
2013/0286928 A1 10/2013  Xu et al.
(Continued)

FOREIGN PATENT DOCUMENTS

WO   2018144638 A1   8/2018
WO   2018191538 A1   10/2018

OTHER PUBLICATIONS

LG Electronics; "Non-anchor PRB enhancements for eNB-IoT"; 3GPP TSG RAN WG1 Meeting #87 R1-1611765; Reno, USA; Nov. 14, 2016; 4 pages.
(Continued)

*Primary Examiner* — Thai D Hoang
(74) *Attorney, Agent, or Firm* — Kowert, Hood, Munyon, Rankin & Goetzel, P.C.

(57) ABSTRACT

Systems and methods of performing a RACH procedure in a MulteFire scenario are described. An eMTC UE communicates with an eNB on an anchor channel at a predetermined frequency of an unlicensed band and data channels on other frequency hopping channels of the unlicensed band. The UE receives a PBCH signal with System Information Broadcast Anchor (SIB-A-MF) scheduling information, and a SIB-A-MF after the PBCH. The SIB-A-MF indicates a RAC) resource configuration for a RACH procedure and dwell time of the data channels. The dwell time of the anchor
(Continued)

channel is smaller than that of the data channels. The anchor channel includes a UL RACH resource for transmission of a RACH Request. The UE transmits UL RACH messages on UL resources indicated by the SIB-A-MF and receives DL RACH messages on different data channels.

20 Claims, 10 Drawing Sheets

(51) Int. Cl.
    *G16Y 10/75*     (2020.01)
    *H04W 72/04*     (2009.01)
    *H04W 4/70*     (2018.01)

(58) Field of Classification Search
    USPC ......... 370/328–330, 335–345, 349, 436–437
    See application file for complete search history.

(56) References Cited

U.S. PATENT DOCUMENTS

| | | |
|---|---|---|
| 2016/0143059 A1 | 5/2016 | Jha et al. |
| 2016/0183295 A1 | 6/2016 | Liu et al. |
| 2016/0205495 A1 | 7/2016 | Hu et al. |
| 2016/0295503 A1 | 10/2016 | Bucknell et al. |
| 2017/0231011 A1* | 8/2017 | Park ................ H04W 74/006 |
| 2018/0351704 A1* | 12/2018 | Papasakellariou .... H04L 1/1812 |
| 2020/0059321 A1* | 2/2020 | Koorapaty .......... H04L 27/2613 |

OTHER PUBLICATIONS

MulteFire Alliance; "MulteFire Release 1.0 Technical Paper, a New Way to Wireless"; Bosa Roca; Jan. 20, 2017; pp. 1-25, XP055446360.

Extended European Search Report for Patent Application No. EP18794102; dated Oct. 2, 2020; 13 Pages.

"International Application Serial No. PCT/US2018/030872, International Search Report dated Aug. 29, 2018", 4 pgs.

"International Application Serial No. PCT/US2018/030872, Written Opinion dated Aug. 29, 2018", 5 pgs.

Shipon, Ali, et al., "LTE/LTE-A Random Access for Massive Machine-Type Communications in Smart Cities", In: IEEE Communications Magazine, vol. 55, Issue: 1, (Jan. 2017), 76-83.

* cited by examiner

US 11,071,149 B2

MULTEFIRE DESIGN OF RANDOM ACCESS CHANNEL AND RANDOM ACCESS CHANNEL PROCEDURE FOR INTERNET OF THINGS DEVICE OPERATION IN UNLICENSED SPECTRUM

PRIORITY CLAIM

This application is a U.S. National Stage Filing under 35 U.S.C. 371 from International Application No. PCT/US2018/030872, filed May 3, 2018 and published in English as WO 2018/204629 on Nov. 8, 2018, which claims the benefit of priority to U.S. Provisional Patent Application Ser. No. 62/501,884, filed May 5, 2017, and U.S. Provisional Patent Application Ser. No. 62/526,205, filed Jun. 28, 2017, each of which is incorporated herein by reference in its entirety.

TECHNICAL FIELD

Embodiments pertain to radio access networks (RANs). Some embodiments relate to cellular and wireless local area network (WLAN) networks, including Third Generation Partnership Project Long Term Evolution (3GPP LTE) networks and LTE advanced (LTE-A) networks as well as legacy networks, $4^{th}$ generation (4G) networks and $5^{th}$ generation (5G) networks. Some embodiments relate to LTE operation in the unlicensed spectrum using MulteFire, specifically the Internet of Things (IoT) operating in the unlicensed spectrum.

BACKGROUND

The use of 3GPP LTE systems (including LTE and LTE-A systems) has increased due to both an increase in the types of devices user equipment (UEs) using network resources as well as the amount of data and bandwidth being used by various applications, such as video streaming, operating on these UEs. In particular, typical UEs such as cell phones, as well as enhanced Machine Type Communication (eMTC) UEs and Narrowband Internet of Things (NB-IoT) UEs currently use 3GPP LTE systems. The latter such UEs, may include sensors (e.g., sensing environmental conditions) or microcontrollers in appliances or vending machines. The number of eMTC UEs and NB-IoT UEs in use is expected to increase massively, thus leading to further network development in an attempt to accommodate for the disparate requirements of the different types of UEs and to increase throughput to the UEs. In particular, a number of developments have focused on the use of the unlicensed spectrum to provide additional communication channels with which the eNBs and UEs communicate.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

DETAILED DESCRIPTION

Figure 1:
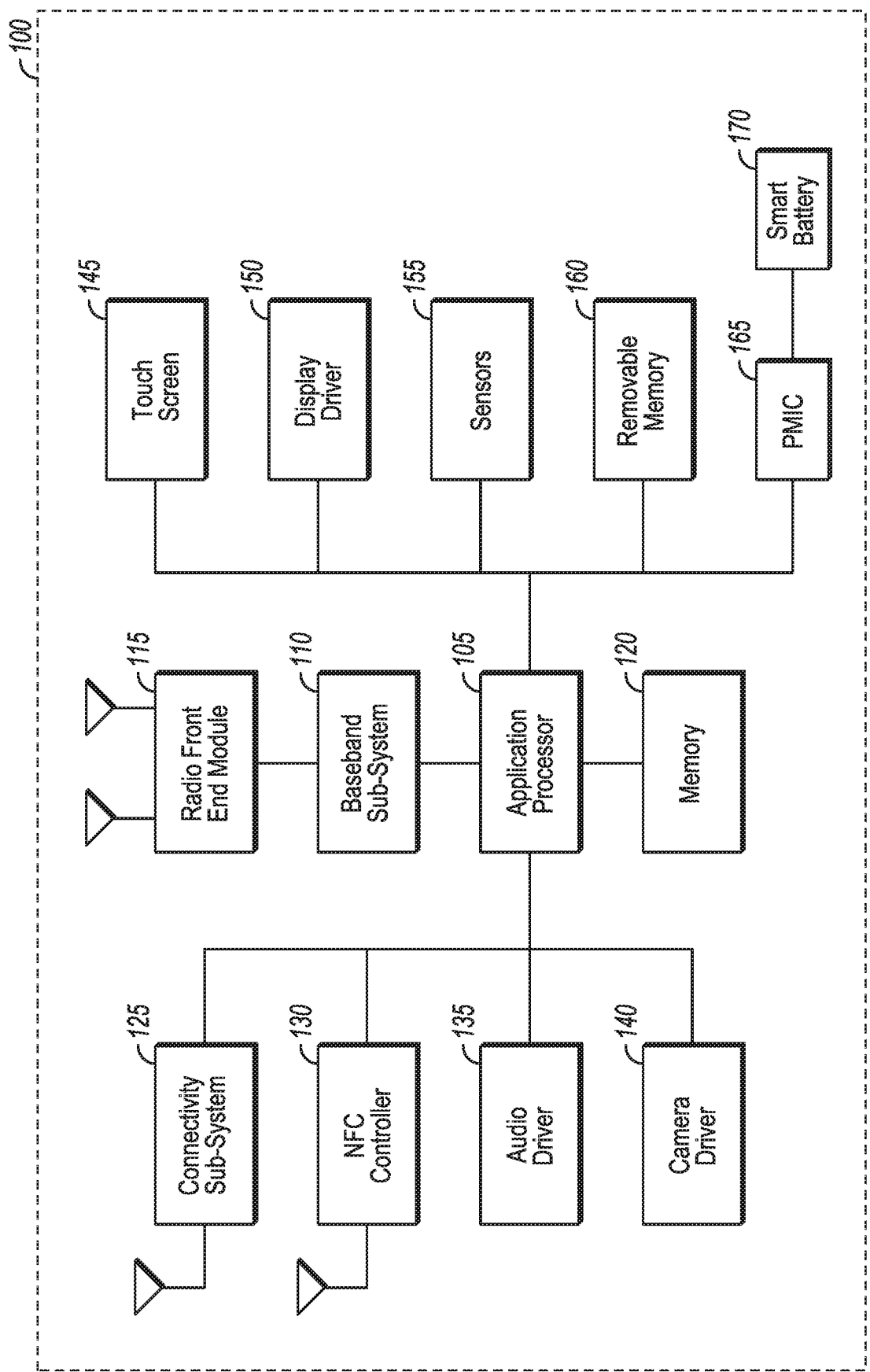
FIG. 1 illustrates a UE in accordance with some embodiments.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Any of the radio links described herein may operate according to any one or more of the following exemplary radio communication technologies and/or standards including, but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17), 3GPP Rel.

18 (3rd Generation Partnership Project Release 18), 3GPP 5G, 3GPP LTE Extra, LTE-Advanced Pro, LTE Licensed-Assisted Access (LAA), MulteFire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS). Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handy-phone System (PHS). Wideband Integrated Digital Enhanced Network (WiDEN), iBurst, Unlicensed Mobile Access (UMA), also referred to as also referred to as 3GPP Generic Access Network, or GAN standard), Zigbee, Bluetooth(r), Wireless Gigabit Alliance (WiGig) standard, mmWave standards in general (wireless systems operating at 10-300 GHz and above such as WiGig, IEEE 802.11ad, IEEE 802.11ay, and the like), technologies operating above 300 GHz and THz bands, (3GPP/LTE based or IEEE 802.11p and other), Vehicle-to-Vehicle (V2V), Vehicle-to-X (V2X). Vehicle-to-Infrastructure (V2I), and Infrastructure-to-Vehicle (I2V) communication technologies, 3GPP cellular V2X, DSRC (Dedicated Short Range Communications) communication systems such as Intelligent-Transport-Systems and others.

Aspects described herein can be used in the context of any spectrum management scheme including, for example, dedicated licensed spectrum, unlicensed spectrum, (licensed) shared spectrum (such as Licensed Shared Access (LSA) in 2.3-2.4 GHz, 3.4-3.6 GHz, 3.6-3.8 GHz and further frequencies and Spectrum Access System (SAS) in 3.55-3.7 GHz and further frequencies). Applicable exemplary spectrum bands include IMT (International Mobile Telecommunications) spectrum (including 450-470 MHz, 790-960 MHz, 1710-2025 MHz, 2110-2200 MHz, 2300-2400 MHz, 2500-2690 MHz, 698-790 MHz 0.610-790 MHz, 3400-3600 MHz, to name a few), IMT-advanced spectrum IMT-2020 spectrum (expected to include 3600-3800 MHz, 3.5 GHz bands, 700 MHz bands, bands within the 24.25-86 GHz range, for example), spectrum made available under the Federal Communications Commission's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 71-76 GHz, 81-86 GHz and 92-94 GHz, etc), the ITS (Intelligent Transport Systems) band of 5.9 GHz (typically 5.85-5.925 GHz) and 63-64 GHz, bands currently allocated to WiGig such as WiGig Band 1 (57.24-59.40 GHz), WiGig Band 2 (59.40-61.56 GHz), WiGig Band 3 (61.56-63.72 GHz), and WiGig Band 4 (63.72-65.88 GHz); the 70.2 GHz-71 GHz band; any band between 65.88 GHz and 71 GHz; bands currently allocated to automotive radar applications such as 76-81 GHz; and future bands including 94-300 GHz and above. Furthermore, the scheme can be used on a secondary basis on bands such as the TV White Space bands (typically below 790 MHz) where in particular the 400 MHz and 700 MHz bands can be employed. Besides cellular applications, specific applications for vertical markets may be addressed, such as PMSE (Program Making and Special Events), medical, health, surgery, automotive, low-latency, drones, and the like.

Aspects described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.

FIG. 1 illustrates a UE in accordance with some embodiments. The user device 100 may be a mobile device in some aspects and includes an application processor 105, baseband processor 110 (also referred to as a baseband sub-system), radio front end module (RFEM) 115, memory 120, connectivity sub-system 125, near field communication (NFC) controller 130, audio driver 135, camera driver 140, touch screen 145, display driver 150, sensors 155, removable memory 160, power management integrated circuit (PMIC) 165 and smart battery 170.

In some aspects, application processor 105 may include, for example, one or more CPU cores and one or more of cache memory, low drop-out voltage regulators (LDOs), interrupt controllers, serial interfaces such as serial peripheral interface (SPI), inter-integrated circuit ($I^2C$) or universal programmable serial interface circuit, real time clock (RTC), timer-counters including interval and watchdog timers, general purpose input-output (IO), memory card controllers such as secure digital/multi-media card (SD/MMC) or similar, universal serial bus (USB) interfaces, mobile industry processor interface (MIPI) interfaces and Joint Test Access Group (JTAG) test access ports.

In some aspects, baseband processor 110 may be implemented, for example, as a solder-down substrate including one or more integrated circuits, a single packaged integrated circuit soldered to a main circuit board, and/or a multi-chip module containing two or more integrated circuits.

Figure 2:
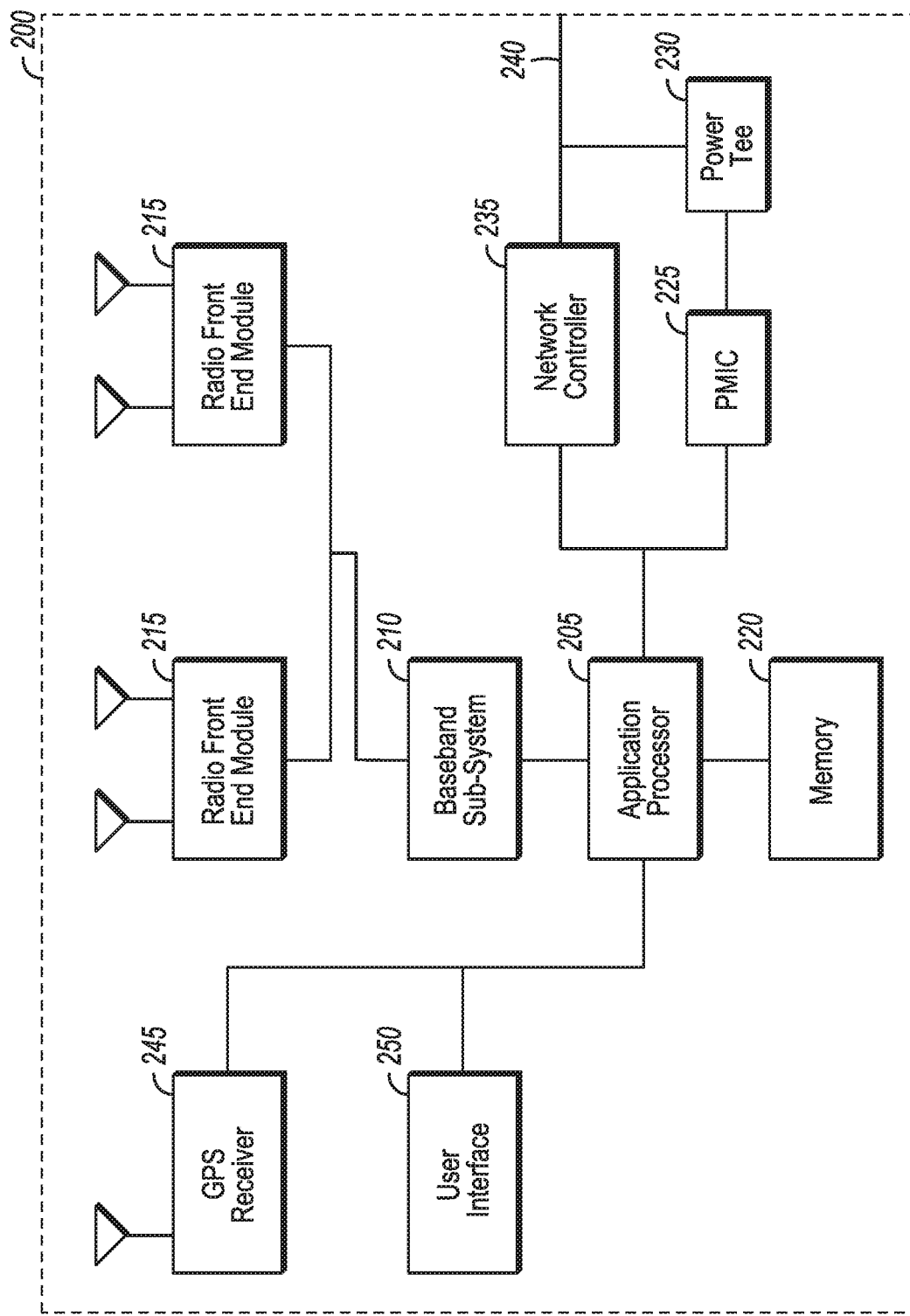
FIG. 2 illustrates a base station or infrastructure equipment radio head in accordance with some embodiments.

FIG. 2 illustrates a base station in accordance with some embodiments. The base station radio head 200 may include one or more of application processor 205, baseband processor 210, one or more radio front end modules 215, memory 220, power management circuitry 225, power tee circuitry 230, network controller 235, network interface connector 240, satellite navigation receiver 245, and user interface 250.

In some aspects, application processor 205 may include one or more CPU cores and one or more of cache memory, low drop-out voltage regulators (LDOs), interrupt controllers, serial interfaces such as SPI, $I^2C$ or universal programmable serial interface, real time clock (RTC), timer-counters including interval and watchdog timers, general purpose IO, memory card controllers such as SD/MMC or similar. USB interfaces, MIPI interfaces and Joint Test Access Group (JTAG) test access ports.

In some aspects, baseband processor 210 may be implemented, for example, as a solder-down substrate including one or more integrated circuits, a single packaged integrated circuit soldered to a main circuit board or a multi-chip module containing two or more integrated circuits.

In some aspects, memory 220 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM) and/or a three-dimensional crosspoint memory. Memory 220 may be implemented as one or more of solder down packaged integrated circuits, socketed memory modules and plug-in memory cards.

In some aspects, power management integrated circuitry 225 may include one or more of voltage regulators, surge protectors, power alarm detection circuitry and one or more backup power sources such as a battery or capacitor. Power alarm detection circuitry may detect one or more of brown out (under-voltage) and surge (over-voltage) conditions.

In some aspects, power tee circuitry 230 may provide for electrical power drawn from a network cable to provide both power supply and data connectivity to the base station radio head 200 using a single cable.

In some aspects, network controller 235 may provide connectivity to a network using a standard network interface protocol such as Ethernet. Network connectivity may be provided using a physical connection which is one of electrical (commonly referred to as copper interconnect), optical or wireless.

In some aspects, satellite navigation receiver 245 may include circuitry to receive and decode signals transmitted by one or more navigation satellite constellations such as the global positioning system (GPS), Globalnaya Navigatsionnaya Sputnikovaya Sistema (GLONASS), Galileo and/or BeiDou. The receiver 245 may provide data to application processor 205 which may include one or more of position data or time data. Application processor 205 may use time data to synchronize operations with other radio base stations.

In some aspects, user interface 250 may include one or more of physical or virtual buttons, such as a reset button, one or more indicators such as light emitting diodes (LEDs) and a display screen.

A radio front end module may incorporate a millimeter wave radio front end module (RFEM) and one or more sub-millimeter wave radio frequency integrated circuits (RFIC). In this aspect, the one or more sub-millimeter wave RFICs may be physically separated from a millimeter wave RFEM. The RFICs may include connection to one or more antennas. The RFEM may be connected to multiple antennas. Alternatively both millimeter wave and sub-millimeter wave radio functions may be implemented in the same physical radio front end module. Thus, the RFEM may incorporate both millimeter wave antennas and sub-millimeter wave antennas.

Figure 3:
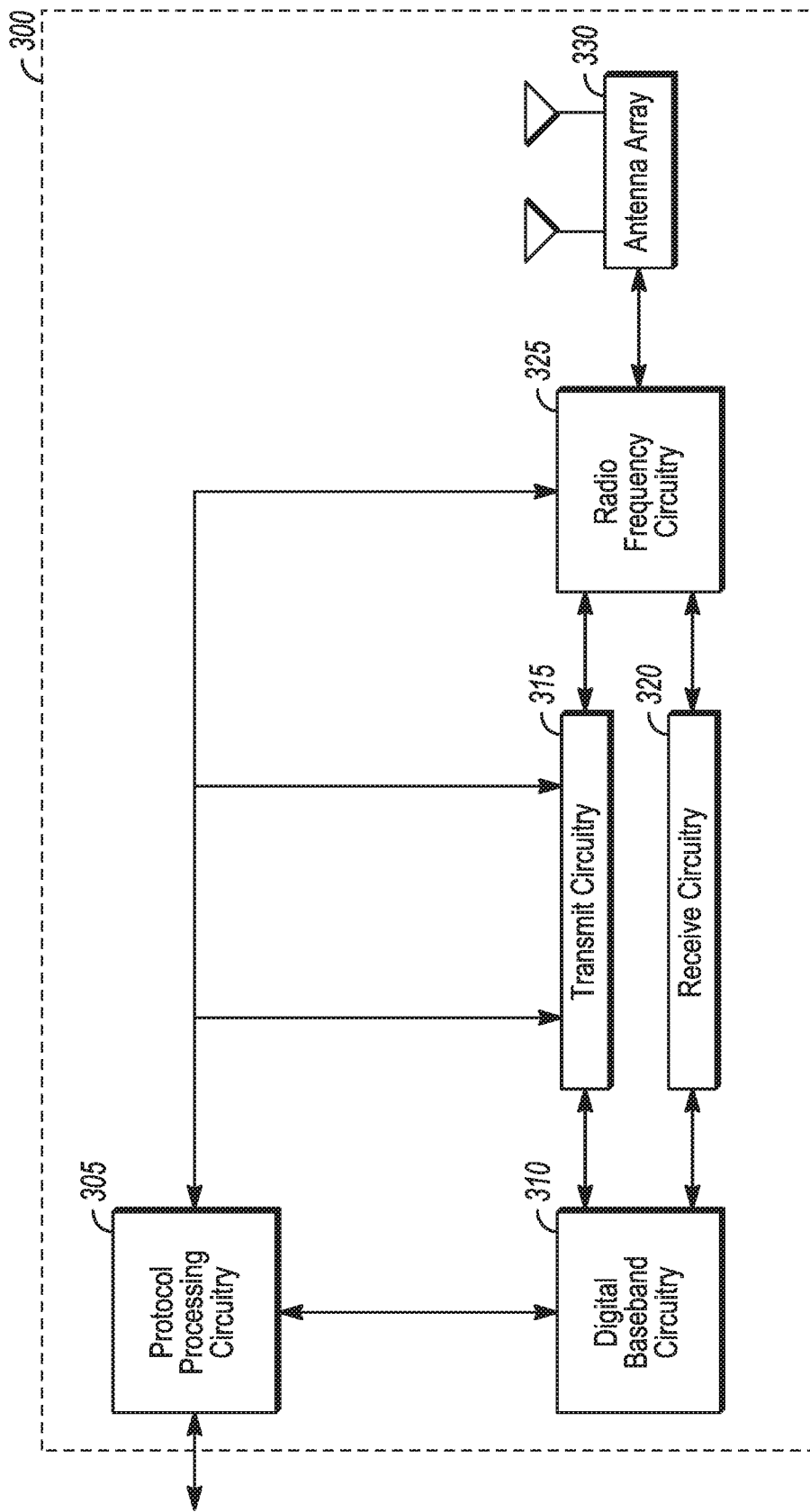
FIG. 3 illustrates millimeter wave communication circuitry in accordance with some embodiments.

FIG. 3 illustrates millimeter wave communication circuitry in accordance with some embodiments. Circuitry 300 is alternatively grouped according to functions. Components as shown in 300 are shown here for illustrative purposes and may include other components not shown here.

Millimeter wave communication circuitry 300 may include protocol processing circuitry 305, which may implement one or more of medium access control (MAC), radio link control (RLC), packet data convergence protocol (PDCP), radio resource control (RRC) and non-access stratum (NAS) functions. Protocol processing circuitry 305 may include one or more processing cores (not shown) to execute instructions and one or more memory structures (not shown) to store program and data information.

Millimeter wave communication circuitry 300 may further include digital baseband circuitry 310, which may implement physical layer (PHY) functions including one or more of hybrid automatic repeat request (HARQ) functions, scrambling and/or descrambling, coding and/or decoding, layer mapping and/or de-mapping, modulation symbol mapping, received symbol and/or bit metric determination, multi-antenna port pre-coding and/or decoding which may include one or more of space-time, space-frequency or spatial coding, reference signal generation and/or detection, preamble sequence generation and/or decoding, synchronization sequence generation and/or detection, control channel signal blind decoding, and other related functions.

Millimeter wave communication circuitry 300 may further include transmit circuitry 315, receive circuitry 320 and/or antenna array circuitry 330.

Millimeter wave communication circuitry 300 may further include radio frequency (RF) circuitry 325. In an aspect, RF circuitry 325 may include multiple parallel RF chains for one or more of transmit or receive functions, each connected to one or more antennas of the antenna array 330.

In an aspect of the disclosure, protocol processing circuitry 305 may include one or more instances of control circuitry (not shown) to provide control functions for one or more of digital baseband circuitry 310, transmit circuitry 315, receive circuitry 320, and/or radio frequency circuitry 325.

The transmit circuitry of may include one or more of digital to analog converters (DACs), analog baseband circuitry, up-conversion circuitry and filtering and amplification circuitry, the latter of which may provide an amount of amplification that is controlled by an automatic gain control (AGC). In another aspect, the transmit circuitry may include digital transmit circuitry and output circuitry.

The radio frequency circuitry may include one or more instances of radio chain circuitry, which in some aspects may include one or more filters, power amplifiers, low noise amplifiers, programmable phase shifters and power supplies. The radio frequency circuitry may include power combining and dividing circuitry in some aspects. In some aspects, the power combining and dividing circuitry may operate bidirectionally, such that the same physical circuitry may be configured to operate as a power divider when the device is transmitting, and as a power combiner when the device is receiving. In some aspects, the power combining and dividing circuitry may one or more include wholly or partially separate circuitries to perform power dividing when the device is transmitting and power combining when the device is receiving. In some aspects, the power combining and dividing circuitry may include passive circuitry comprising one or more two-way power divider/combiners arranged in a tree. In some aspects, the power combining and dividing circuitry may include active circuitry comprising amplifier circuits.

In some aspects, the radio frequency circuitry may connect to transmit circuitry and receive circuitry via one or more radio chain interfaces or a combined radio chain interface. In some aspects, one or more radio chain interfaces may provide one or more interfaces to one or more receive or transmit signals, each associated with a single antenna structure which may comprise one or more antennas.

In some aspects, the combined radio chain interface may provide a single interface to one or more receive or transmit signals, each associated with a group of antenna structures comprising one or more antennas.

The receive circuitry may include one or more of parallel receive circuitry and/or one or more of combined receive circuitry. In some aspects, the one or more parallel receive circuitry and one or more combined receive circuitry may include one or more Intermediate Frequency (IF) down-conversion circuitry, IF processing circuitry, baseband down-conversion circuitry, baseband processing circuitry and analog-to-digital converter (ADC) circuitry.

In an aspect, the RF circuitry may include one or more of each of IF interface circuitry, filtering circuitry, upconversion and downconversion circuitry, synthesizer circuitry, filtering and amplification circuitry, power combining and dividing circuitry and radio chain circuitry.

In an aspect, the baseband processor may contain one or more digital baseband systems. In an aspect, the one or more digital baseband subsystems may be coupled via an interconnect subsystem to one or more of a CPU subsystem, audio subsystem and interface subsystem. In an aspect, the one or more digital baseband subsystems may be coupled via another interconnect subsystem to one or more of each of digital baseband interface and mixed-signal baseband sub-system. In an aspect, the interconnect subsystems may each include one or more of each of buses point-to-point connections and network-on-chip (NOC) structures.

In an aspect, an audio sub-system may include one or more of digital signal processing circuitry, buffer memory, program memory, speech processing accelerator circuitry, data converter circuitry such as analog-to-digital and digital-to-analog converter circuitry, and analog circuitry including one or more of amplifiers and filters. In an aspect, a mixed signal baseband sub-system may include one or more of an IF interface, analog IF subsystem, downconverter and upconverter subsystem, analog baseband subsystem, data converter subsystem, synthesizer and control sub-system.

A baseband processing subsystem may include one or more of each of DSP sub-systems, interconnect sub-system, boot loader sub-system, shared memory sub-system, digital I/O sub-system, digital baseband interface sub-system and audio sub-system. In an example aspect, the baseband processing subsystem may include one or more of each of an accelerator subsystem, buffer memory, interconnect subsystem, audio sub-system, shared memory sub-system, digital I/O sub-system, controller sub-system and digital baseband interface sub-system.

In an aspect, the boot loader sub-system may include digital logic circuitry configured to perform configuration of the program memory and running state associated with each of the one or more DSP sub-systems. The configuration of the program memory of each of the one or more DSP sub-systems may include loading executable program code from storage external to baseband processing sub-system. The configuration of the running state associated with each of the one or more DSP sub-systems may include one or more of the steps of: setting the state of at least one DSP core which may be incorporated into each of the one or more DSP sub-systems to a state in which it is not running, and setting the state of at least one DSP core which may be incorporated into each of the one or more DSP sub-systems into a state in which it begins executing program code starting from a predefined memory location.

In an aspect, the shared memory sub-system may include one or more of a read-only memory (ROM), static random access memory (SRAM), embedded dynamic random access memory (eDRAM) and non-volatile random access memory (NVRAM). In an aspect, the digital I/O subsystem may include one or more of serial interfaces such as I²C, SPI or other 1, 2 or 3-wire serial interfaces, parallel interfaces such as general-purpose input-output (GPIO), register access interfaces and direct memory access (DMA). In an aspect, a register access interface implemented in digital I/O subsystem may permit a microprocessor core external to baseband processing subsystem (1000 cross reference) to read and/or write one or more of control and data registers and memory.

In an aspect, DMA logic circuitry implemented in digital I/O subsystem may permit transfer of contiguous blocks of data between memory locations including memory locations internal and external to baseband processing subsystem. In an aspect, the digital baseband interface sub-system may provide for the transfer of digital baseband samples between the baseband processing subsystem and mixed signal baseband or radio-frequency circuitry external to the baseband processing subsystem. In an aspect, the digital baseband samples transferred by the digital baseband interface sub-system may include in-phase and quadrature (I/Q) samples.

In an aspect, the controller sub-system may include one or more of each of control and status registers and control state machines. In an aspect, the control and status registers may be accessed via a register interface and may provide for one or more of: starting and stopping operation of control state machines, resetting control state machines to a default state, configuring optional processing features, configuring the generation of interrupts and reporting the status of operations. In an aspect, each of the one or more control state machines may control the sequence of operation of each of the one or more accelerator sub-systems.

In an aspect, the DSP sub-system may include one or more of each of a DSP core sub-system, local memory, direct memory access sub-system, accelerator sub-system, external interface sub-system, power management unit and interconnect sub-system. In an aspect, the local memory may include one or more of each of read-only memory, static random access memory or embedded dynamic random access memory. In an aspect, the direct memory access sub-system may provide registers and control state machine circuitry adapted to transfer blocks of data between memory locations including memory locations internal and external to the digital signal processor sub-system. In an aspect, the external interface sub-system may provide for access by a microprocessor system external to DSP sub-system to one or more of memory, control registers and status registers which may be implemented in the DSP sub-system. In an aspect, the external interface sub-system may provide for transfer of data between local memory and storage external to the DSP sub-system under the control of one or more of the DMA sub-system and DSP core sub-system.

Figure 4:
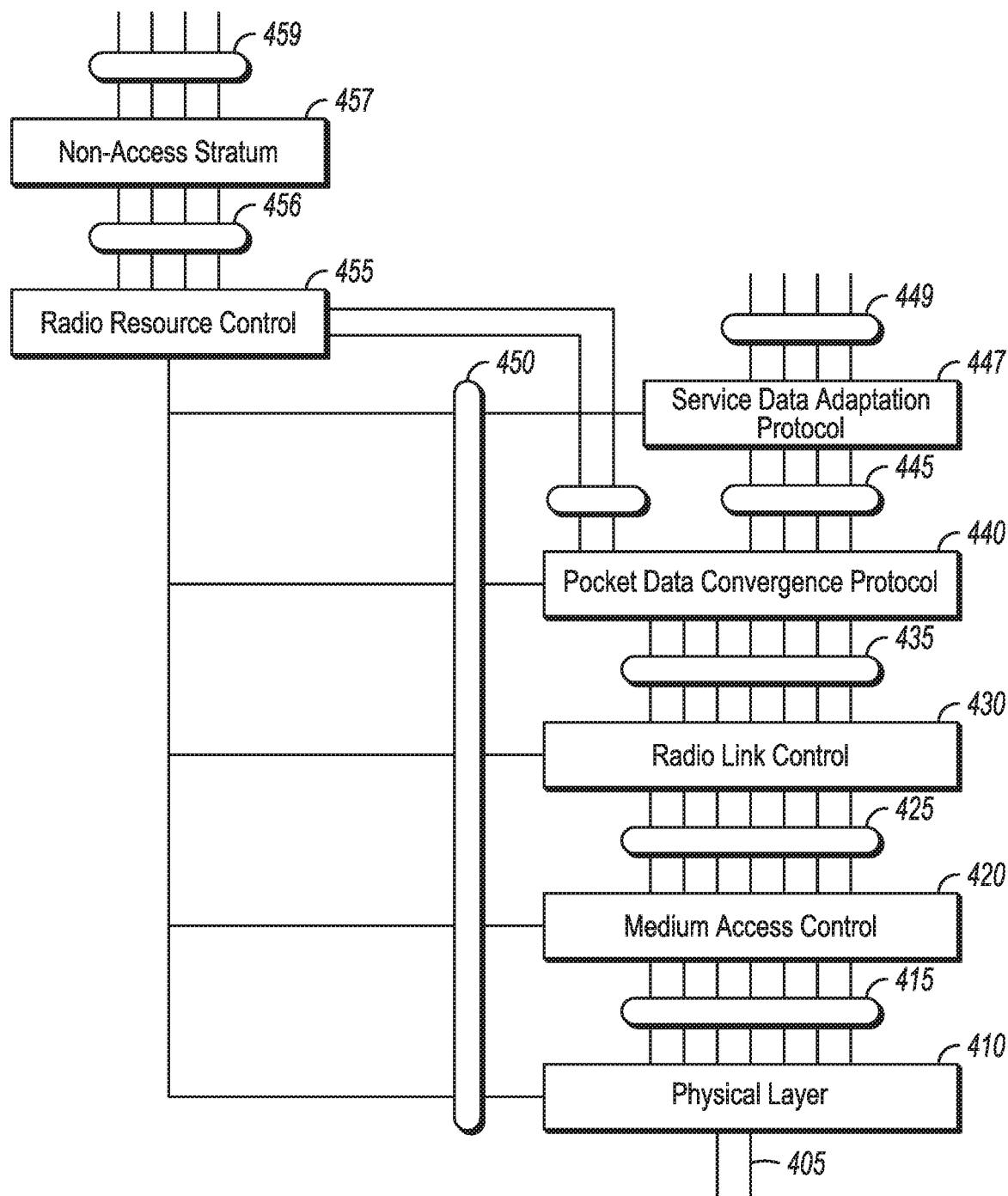
FIG. 4 is an illustration of protocol functions in accordance with some embodiments.

FIG. 4 is an illustration of protocol functions in accordance with some embodiments. The protocol functions may be implemented in a wireless communication device according to some aspects. In some aspects, the protocol layers may include one or more of physical layer (PHY) 410, medium access control layer (MAC) 420, radio link control layer (RLC) 430, packet data convergence protocol layer (PDCP) 440, service data adaptation protocol (SDAP) layer 447, radio resource control layer (RRC) 455, and non-access stratum (NAS) layer 457, in addition to other higher layer functions not illustrated.

According to some aspects, the protocol layers may include one or more service access points that may provide communication between two or more protocol layers. According to some aspects, the PHY 410 may transmit and receive physical layer signals 405 that may be received or transmitted respectively by one or more other communication devices. According to some aspects, physical layer signals 405 may comprise one or more physical channels.

According to some aspects, an instance of PHY 410 may process requests from and provide indications to an instance of MAC 420 via one or more physical layer service access points (PHY-SAP) 415. According to some aspects, requests and indications communicated via PHY-SAP 415 may comprise one or more transport channels.

According to some aspects, an instance of MAC 410 may process requests from and provide indications to an instance of RLC 430 via one or more medium access control service access points (MAC-SAP) 425. According to some aspects, requests and indications communicated via MAC-SAP 425 may comprise one or more logical channels.

According to some aspects, an instance of RLC 430 may process requests from and provide indications to an instance of PDCP 440 via one or more radio link control service access points (RLC-SAP) 435. According to some aspects, requests and indications communicated via RLC-SAP 435 may comprise one or more RLC channels.

According to some aspects, an instance of PDCP 440 may process requests from and provide indications to one or more of an instance of RRC 455 and one or more instances of SDAP 447 via one or more packet data convergence protocol service access points (PDCP-SAP) 445. According to some aspects, requests and indications communicated via PDCP-SAP 445 may comprise one or more radio bearers.

According to some aspects, an instance of SDAP 447 may process requests from and provide indications to one or more higher layer protocol entities via one or more service data adaptation protocol service access points (SDAP-SAP) 449. According to some aspects, requests and indications communicated via SDAP-SAP 449 may comprise one or more quality of service (QoS) flows.

According to some aspects. RRC entity 455 may configure, via one or more management service access points (M-SAP), aspects of one or more protocol layers, which may include one or more instances of PHY 410, MAC 420, RLC 430, PDCP 440 and SDAP 447. According to some aspects, an instance of RRC 455 may process requests from and provide indications to one or more NAS entities via one or more RRC service access points (RRC-SAP) 456.

Figure 5:
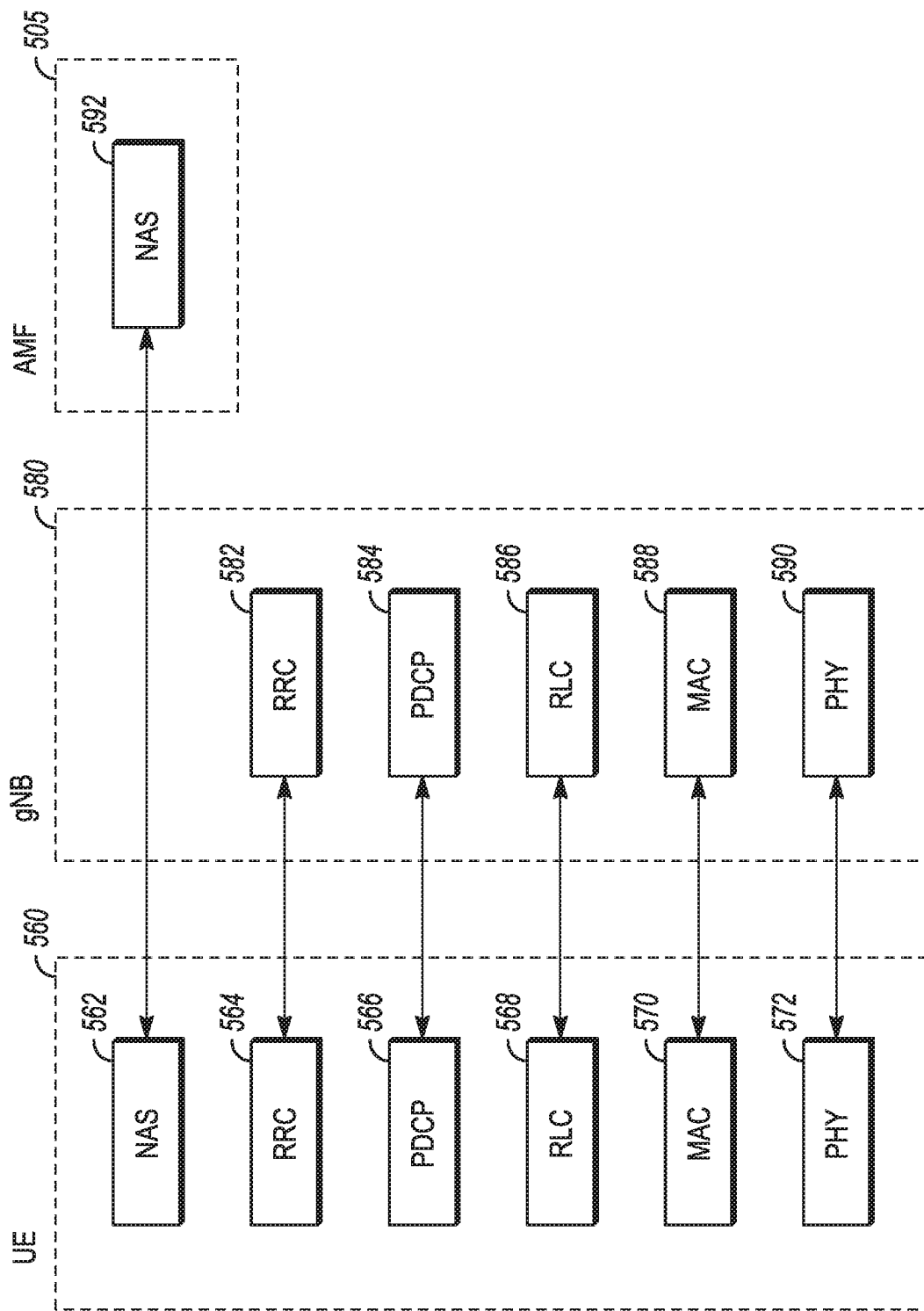
FIG. 5 is an illustration of protocol entities in accordance with some embodiments.

FIG. 5 is an illustration of protocol entities in accordance with some embodiments. The protocol entities may be implemented in wireless communication devices, including one or more of a user equipment (UE) 560, a base station, which may be termed an evolved node B (eNB), or new radio node B (gNB) 580, and a network function, which may be termed a mobility management entity (MME), or an access and mobility management function (AMF) 594, according to some aspects.

According to some aspects, gNB 580 may be implemented as one or more of a dedicated physical device such as a macro-cell, a femto-cell or other suitable device, or in an alternative aspect, may be implemented as one or more software entities running on server computers as part of a virtual network termed a cloud radio access network (CRAN).

According to some aspects, one or more protocol entities that may be implemented in one or more of UE 560, gNB 580 and AMF 594, may be described as implementing all or part of a protocol stack in which the layers are considered to be ordered from lowest to highest in the order PHY, MAC, RLC, PDCP, RRC and NAS. According to some aspects, one or more protocol entities that may be implemented in one or more of UE 560, gNB 580 and AMF 594, may communicate with a respective peer protocol entity that may be implemented on another device, using the services of respective lower layer protocol entities to perform such communication.

According to some aspects, UE PHY 572 and peer entity gNB PHY 590 may communicate using signals transmitted and received via a wireless medium. According to some aspects, UE MAC 570 and peer entity gNB MAC 588 may communicate using the services provided respectively by UE PHY 572 and gNB PHY 590. According to some aspects, UE RLC 568 and peer entity gNB RLC 586 may communicate using the services provided respectively by UE MAC 570 and gNB MAC 588. According to some aspects, UE PDCP 566 and peer entity gNB PDCP 584 may communicate using the services provided respectively by UE RLC 568 and 5GNB RLC 586. According to some aspects, UE RRC 564 and gNB RRC 582 may communicate using the services provided respectively by UE PDCP 566 and gNB PDCP 584. According to some aspects, UE NAS 562 and AMF NAS 592 may communicate using the services provided respectively by UE RRC 564 and gNB RRC 582.

The UE and gNB may communicate using a radio frame structure that has a predetermined duration and repeats in a periodic manner with a repetition interval equal to the predetermined duration. The radio frame may be divided into two or more subframes. In an aspect, subframes may be of predetermined duration which may be unequal. In an alternative aspect, subframes may be of a duration which is determined dynamically and varies between subsequent repetitions of the radio frame. In an aspect of frequency division duplexing (FDD), the downlink radio frame structure is transmitted by a base station to one or devices, and uplink radio frame structure transmitted by a combination of one or more devices to a base station. The radio frame may have a duration of 10 ms. The radio frame may be divided into slots each of duration 0.5 ms, and numbered from 0 to 19. Additionally, each pair of adjacent slots numbered 2i and 2i+1, where i is an integer, may be referred to as a subframe. Each subframe may include a combination of one or more of downlink control information, downlink data information, uplink control information and uplink data information. The combination of information types and direction may be selected independently for each subframe.

According to some aspects, the downlink frame and uplink frame may have a duration of 10 ms, and uplink frame may be transmitted with a timing advance with respect to downlink frame. According to some aspects, the downlink frame and uplink frame may each be divided into two or more subframes, which may be 1 ms in duration. According to some aspects, each subframe may consist of one or more slots. In some aspects, the time intervals may be represented in units of $T_s$. According to some aspects, $T_s$ may be defined as $1/(30.720 \times 1000)$ seconds. According to some aspects, a radio frame may be defined as having duration $30.720 \cdot T_s$, and a slot may be defined as having duration $15.360 \cdot T_s$. According to some aspects, $T_s$ may be defined as $$T_s = 1/(\Delta f_{max} \cdot N_f).$$

where $\Delta f_{max} = 480 \times 10^3$ and $Nf = 4,096$. According to some aspects E, the number of slots may be determined based on a numerology parameter, which may be related to a frequency spacing between subcarriers of a multicarrier signal used for transmission.

Constellation designs of a single carrier modulation scheme that may be transmitted or received may contain 2 points, known as binary phase shift keying (BPSK), 4 points, known as quadrature phase shift keying (QPSK), 16 points, known as quadrature amplitude modulation (QAM) with 16 points (16QAM or QAM16) or higher order modulation constellations, containing for example 64, 256 or 1024 points. In the constellations, the binary codes are assigned to the points of the constellation using a scheme such that nearest-neighbor points, that is, pairs of points separated from each other by the minimum Euclidian distance, have an assigned binary code differing by only one binary digit. For example, the point assigned code 1000 has nearest neighbor points assigned codes 1001, 0000, 1100 and 1010, each of which differs from 1000 by only one bit.

Alternatively, the constellation points may be arranged in a square grid, and may be arranged such that there is an equal distance on the in-phase and quadrature plane between each pair of nearest-neighbor constellation points. In an aspect, the constellation points may be chosen such that there is a pre-determined maximum distance from the origin of the in-phase and quadrature plane of any of the allowed constellation points, the maximum distance represented by a circle. In an aspect, the set of allowed constellation points may exclude those that would fall within square regions at the corners of a square grid. The constellation points are shown on orthogonal in-phase and quadrature axes, representing, respectively, amplitudes of sinusoids at the carrier frequency and separated in phase from one another by 90 degrees. In an aspect, the constellation points are grouped into two or more sets of constellation points, the points of each set being arranged to have an equal distance to the origin of the in-phase and quadrature plane, and lying on one of a set of circles centered on the origin.

To generate multicarrier baseband signals for transmission, data may be input to an encoder to generate encoded data. The encoder may include a combination of one or more of error detecting, error correcting, rate matching, and interleaving. The encoder may further include a step of scrambling. In an aspect, encoded data may be input to a modulation mapper to generate complex valued modulation symbols. The modulation mapper may map groups containing one or more binary digits, selected from the encoded data, to complex valued modulation symbols according to one or more mapping tables. In an aspect, complex-valued modulation symbols may be input to the layer mapper to be mapped to one or more layer mapped modulation symbol streams. Representing a stream of modulation symbols 440 as d(i) where i represents a sequence number index, and the one or more streams of layer mapped symbols as $x^{(k)}(i)$ where k represents a stream number index and i represents a sequence number index, the layer mapping function for a single layer may be expressed as:

$x^{(0)}(i)=d(i)$ and the layer mapping for two layers may be expressed as:

$x^{(0)}(i)=d(2i)$ $x^{(1)}(i)=d(2i+1)$

Layer mapping may be similarly represented for more than two layers.

In an aspect, one or more streams of layer mapped symbols may be input to the precoder which generates one or more streams of precoded symbols. Representing the one or more streams of layer mapped symbols as a block of vectors:

$[x^{(0)}(i) \ldots x^{(v-1)}(i)]^T$ where i represents a sequence number index in the range 0 to $M_{symb}^{layer}-1$ the output is represented as a block of vectors:

$[z^{(0)}(i) \ldots z^{(P-1)}(i)]^T$ where i represents a sequence number index in the range 0 to $M_{symb}^{ap}-1$. The precoding operation may be configured to include one of direct mapping using a single antenna port, transmit diversity using space-time block coding, or spatial multiplexing.

In an aspect, each stream of precoded symbols may be input to a resource mapper which generates a stream of resource mapped symbols. The resource mapper may map precoded symbols to frequency domain subcarriers and time domain symbols according to a mapping which may include contiguous block mapping, randomized mapping or sparse mapping according to a mapping code.

In an aspect, the resource mapped symbols may be input to multicarrier generator which generates a time domain baseband symbol. Multicarrier generator may generate time domain symbols using, for example, an inverse discrete Fourier transform (DFT), commonly implemented as an inverse fast Fourier transform (FFT) or a filter bank comprising one or more filters. In an aspect, where resource mapped symbols 455 are represented as $s_k(i)$, where k is a subcarrier index and i is a symbol number index, a time domain complex baseband symbol x(t) may be represented as:

$$x(t) = \sum_k s_k(i) p_T(t - T_{sym}) \exp[j 2\pi f_k(t - T_{sym} - \tau_k)]$$

Where $p_T(t)$ is a prototype filter function, $T_{sym}$ is the start time of the symbol period, $\tau_k$ is a subcarrier dependent time offset, and $f_k$ is the frequency of subcarrier k. Prototype functions $p_T(t)$ may be, for example, rectangular time domain pulses, Gaussian time domain pulses or any other suitable function.

In some aspects, a sub-component of a transmitted signal consisting of one subcarrier in the frequency domain and one symbol interval in the time domain may be termed a resource element. Resource elements may be depicted in a grid form. In some aspects, resource elements may be grouped into rectangular resource blocks consisting of 12 subcarriers in the frequency domain and the P symbols in the time domain, where P may correspond to the number of symbols contained in one slot, and may be 6, 7, or any other suitable number of symbols. In some alternative aspects, resource elements may be grouped into resource blocks consisting of 12 subcarriers in the frequency domain and one symbol in the time domain. Each resource element 05 may be indexed as (k, l) where k is the index number of subcarrier, in the range 0 to N·M−1, where N is the number of subcarriers in a resource block, and M is the number of resource blocks spanning a component carrier in the frequency domain.

In some aspects, coding of the signal to be transmitted may include one or more physical coding processes that may be used to provide coding for a physical channel that may encode data or control information. Coding may also include multiplexing and interleaving that generates combined coded information by combining information from one or more sources, which may include one of more of data information and control information, and which may have been encoded by one or more physical coding processes. The combined coded information may be input to a scrambler which may generate scrambled coded information. Physical coding process may include one or more of CRC attachment, code block segmentation, channel coding, rate matching and code block concatenation. An encoder that may be used to encode data according to one of a convolutional code and a tail-biting convolutional code.

A MAC entity that may be used to implement medium access control layer functions may include one or more of a controller, a logical channel prioritizing unit, a channel multiplexer & de-multiplexer, a PDU filter unit, random access protocol entity, data hybrid automatic repeat request protocol (HARQ) entity and broadcast HARQ entity. According to some aspects, a higher layer may exchange control and status messages with controller via management service access point. According to some aspects, MAC service data units (SDU) corresponding to one or more logical channels may be exchanged with the MAC entity via one or more service access points (SAP). According to some aspects, a PHY SDU corresponding to one or more transport channels may be exchanged with a physical layer entity via one or more SAPs. According to some aspects, the logical channel prioritization unit may perform prioritization amongst one or more logical channels, which may include storing parameters and state information corresponding to each of the one or more logical channels, that may be initialized when a logical channel is established. According to some aspects, the logical channel prioritization unit may be configured with a set of parameters for each of one or more logical channels, each set including parameters which may include one or more of a prioritized bit rate (PBR) and a bucket size duration (BSD).

According to some aspects, the multiplexer & de-multiplexer may generate MAC PDUs, which may include one or more of MAC-SDUs or partial MAC-SDUs corresponding to one or more logical channels, a MAC header which may include one or more MAC sub-headers, one or more MAC control elements, and padding data. According to some aspects, the multiplexer & de-multiplexer may separate one or more MAC-SDUs or partial MAC-SDUs contained in a received MAC PDU, corresponding to one or more logical channels, and may indicate the one or more MAC-SDUs or partial MAC-SDUs to a higher layer via one or more service access points. According to some aspects, the HARQ entity and broadcast HARQ entity may include one or more parallel HARQ processes, each of which may be associated with a HARQ identifier, and which may be one of a receive or transmit HARQ process.

According to some aspects, a transmit HARQ process may generate a transport block (TB) to be encoded by the PHY according to a specified redundancy version (RV), by selecting a MAC-PDU for transmission. According to some aspects, a transmit HARQ process that is included in a broadcast HARQ entity may retransmit a same TB in successive transmit intervals a predetermined number of times. According to some aspects, a transmit HARQ process included in a HARQ entity may determine whether to retransmit a previously transmitted TB or to transmit a new TB at a transmit time based on whether a positive acknowledgement or a negative acknowledgement was received for a previous transmission.

According to some aspects, a receive HARQ process may be provided with encoded data corresponding to one or more received TBs and which may be associated with one or more of a new data indication (NDI) and a redundancy version (RV), and the receive HARQ process may determine whether each such received encoded data block corresponds to a retransmission of a previously received TB or a not previously received TB. According to some aspects, a receive HARQ process may include a buffer, which may be implemented as a memory or other suitable storage device, and may be used to store data based on previously received data for a TB. According to some aspects, a receive HARQ process may attempt to decode a TB, the decoding based on received data for the TB, and which may be additionally be based on the stored data based on previously received data for the TB.

Figure 6:
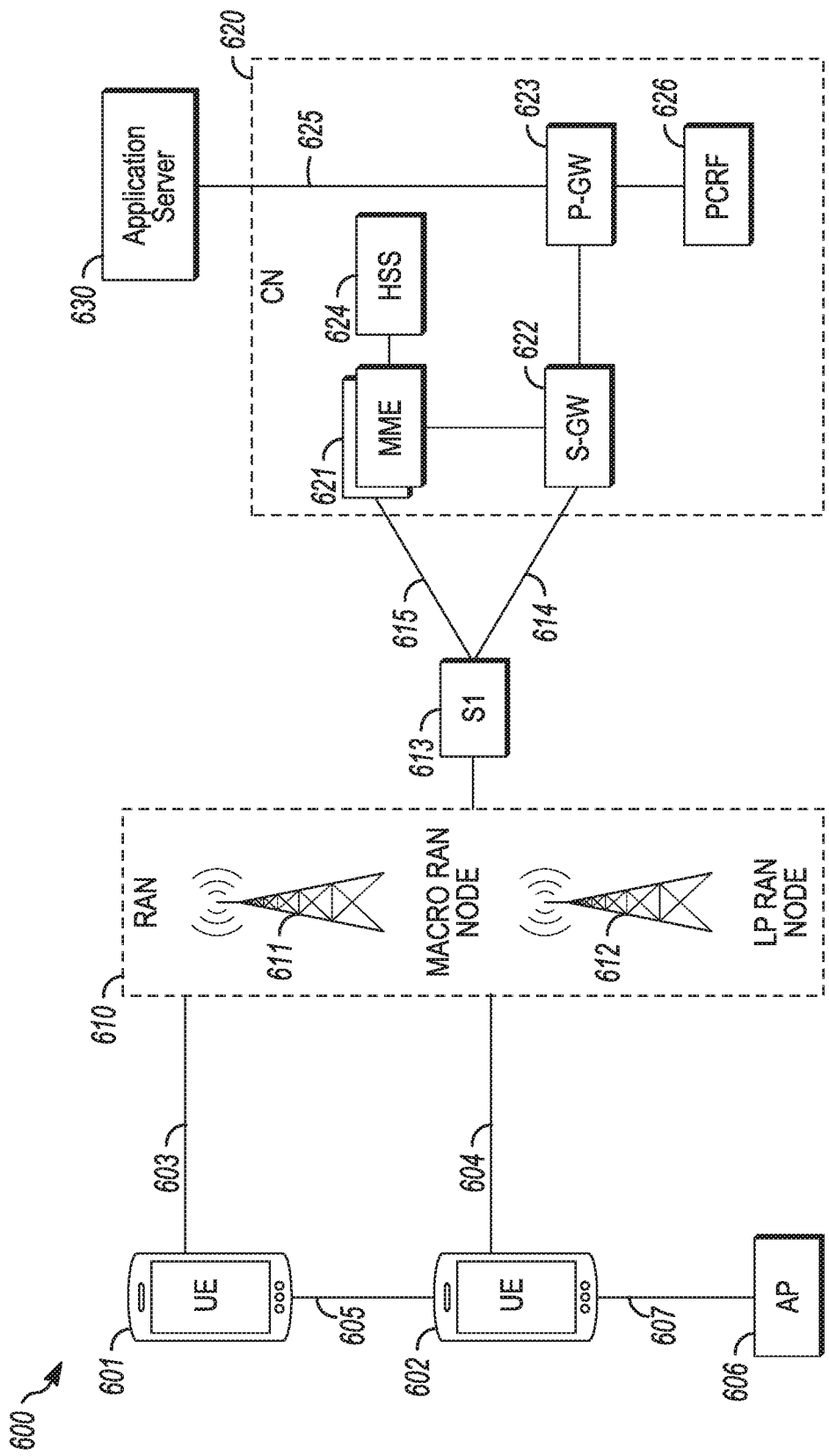
FIG. 6 illustrates an architecture of a system of a network in accordance with some embodiments.

FIG. 6 illustrates an architecture of a system of a network in accordance with some embodiments. The system 600 is shown to include a user equipment (UE) 601 and a UE 602. The UEs 601 and 602 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 601 and 602 can comprise an Internet of Things (IoT) UE, which can comprise a network access layer designed for low-power IoT applications utilizing short-lived UE connections. An IoT UE can utilize technologies such as machine-to-machine (M2M) or MTC for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 601 and 602 may be configured to connect, e.g., communicatively couple, with a radio access network (RAN) 610—the RAN 610 may be, for example, an Evolved Universal Mobile Telecommunications System (UMTS) Terrestrial Radio Access Network (E-UTRAN), a NextGen RAN (NG RAN), or some other type of RAN. The UEs 601 and 602 utilize connections 603 and 604, respectively, each of which comprises a physical communications interface or layer (discussed in further detail below); in this example, the connections 603 and 604 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a 5G protocol, a New Radio (NR) protocol, and the like.

In this embodiment, the UEs 601 and 602 may further directly exchange communication data via a ProSe interface 605. The ProSe interface 605 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 602 is shown to be configured to access an access point (AP) 606 via connection 607. The connection 607 can comprise a local wireless connection, such as a connection consistent with any IEEE 802.11 protocol, wherein the AP 606 would comprise a wireless fidelity (WiFi) router. In this example, the AP 606 is shown to be connected to the Internet without connecting to the core network of the wireless system (described in further detail below).

The RAN 610 can include one or more access nodes that enable the connections 603 and 604. These access nodes (ANs) can be referred to as base stations (BSs), NodeBs, evolved NodeBs (eNBs), next Generation NodeBs (gNBs), RAN nodes, and so forth, and can comprise ground stations (e.g., terrestrial access points) or satellite stations providing coverage within a geographic area (e.g., a cell). The RAN 610 may include one or more RAN nodes for providing macrocells, e.g., macro RAN node 611, and one or more RAN nodes for providing femtocells or picocells (e.g., cells having smaller coverage areas, smaller user capacity, or higher bandwidth compared to macrocells), e.g., low power (LP) RAN node 612.

Any of the RAN nodes 611 and 612 can terminate the air interface protocol and can be the first point of contact for the UEs 601 and 602. In some embodiments, any of the RAN nodes 611 and 612 can fulfill various logical functions for the RAN 610 including, but not limited to, radio network controller (RNC) functions such as radio bearer management, uplink and downlink dynamic radio resource management and data packet scheduling, and mobility management.

In accordance with some embodiments, the UEs 601 and 602 can be configured to communicate using Orthogonal Frequency-Division Multiplexing (OFDM) communication signals with each other or with any of the RAN nodes 611 and 612 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

The physical downlink shared channel (PDSCH) may carry user data and higher-layer signaling to the UEs 601 and 602. The physical downlink control channel (PDCCH) may carry information about the transport format and resource allocations related to the PDSCH channel, among other things. It may also inform the UEs 601 and 602 about the transport format, resource allocation, and H-ARQ (Hybrid Automatic Repeat Request) information related to the uplink shared channel. Typically, downlink scheduling (assigning control and shared channel resource blocks to the UE 602 within a cell) may be performed at any of the RAN nodes 611 and 612 based on channel quality information fed back from any of the UEs 601 and 602. The downlink resource assignment information may be sent on the PDCCH used for (e.g., assigned to) each of the UEs 601 and 602.

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 610 is shown to be communicatively coupled to a core network (CN) 620—via an S or NG interface 613. In embodiments, the CN 620 may be an evolved packet core (EPC) network, a 5GC network, or some other type of CN. In this embodiment, the S1 interface 613 is split into two parts: the S1-U interface 614, which carries traffic data between the RAN nodes 611 and 612 and the serving gateway (S-GW) 622, and the S-mobility management entity (MME) interface 615, which is a signaling interface between the RAN nodes 611 and 612 and MMEs 621.

In this embodiment, the CN 620 comprises the MMEs 621, the S-GW 622, the Packet Data Network (PDN) Gateway (P-GW) 623, and a home subscriber server (HSS) 624. The MMEs 621 may be similar in function to the control plane of legacy Serving General Packet Radio Service (GPRS) Support Nodes (SGSN). The MMEs 621 may manage mobility aspects in access such as gateway selection and tracking area list management. The HSS 624 may comprise a database for network users, including subscription-related information to support the network entities' handling of communication sessions. The CN 620 may comprise one or several HSSs 624, depending on the number of mobile subscribers, on the capacity of the equipment, on the organization of the network, etc. For example, the HSS 624 can provide support for routing/roaming, authentication, authorization, naming/addressing resolution, location dependencies, etc.

The S-GW 622 may terminate the S1 interface 613 towards the RAN 610, and routes data packets between the RAN 610 and the CN 620. In addition, the S-GW 622 may be a local mobility anchor point for inter-RAN node handovers and also may provide an anchor for inter-3GPP mobility. Other responsibilities may include lawful intercept, charging, and some policy enforcement.

The P-GW 623 may terminate an SGi interface toward a PDN. The P-GW 623 may route data packets between the EPC network 623 and external networks such as a network including the application server 630 (alternatively referred to as application function (AF)) via an Internet Protocol (IP) interface 625. Generally, the application server 630 may be an element offering applications that use IP bearer resources with the core network (e.g., UMTS Packet Services (PS) domain, LTE PS data services, etc.). In this embodiment, the P-GW 623 is shown to be communicatively coupled to an application server 630 via an IP communications interface 625. The application server 630 can also be configured to support one or more communication services (e.g., Voice-over-Internet Protocol (VoIP) sessions, PTT sessions, group communication sessions, social networking services, etc.) for the UEs 601 and 602 via the CN 620.

The P-GW 623 may further be a node for policy enforcement and charging data collection. Policy and Charging Rules Function (PCRF) 626 is the policy and charging control element of the CN 620. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 626 may be communicatively coupled to the application server 630 via the P-GW 623. The application server 630 may signal the PCRF 626 to indicate a new service flow and select the appropriate Quality of Service (QoS) and charging parameters. The PCRF 626 may provision this rule into a Policy and Charging Enforcement Function (PCEF) (not shown) with the appropriate traffic flow template (TFT) and QoS class of identifier (QCI), which commences the QoS and charging as specified by the application server 630.

The components of FIG. 6 are able to read instructions from a machine-readable or computer-readable medium (e.g., a non-transitory machine-readable storage medium) and perform any one or more of the methodologies discussed herein. In particular, the processors (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may read and follow the instructions on a non-transitory medium.

Instructions may comprise software, a program, an application, an applet, an app, or other executable code for causing at least any of the processors to perform any one or more of the methodologies discussed herein. The instructions may reside, completely or partially, within at least one of the processors (e.g., within the processor's cache memory), the memory/storage devices, or any suitable combination thereof. In some embodiments, the instructions may reside on a tangible, non-volatile communication device readable medium, which may include a single medium or multiple media. Furthermore, any portion of the instructions may be transferred to the hardware resources from any combination of the peripheral devices or the databases 606. Accordingly, the memory of processors, the memory/storage devices, the peripheral devices, and the databases are examples of computer-readable and machine-readable media.

As above, a number of different types of UEs have begun using the LTE spectrum. These devices may form the IoT, where massive numbers of devices are connected through the network. Such connected devices have a wide variety of applications in various scenarios, including smart cities, smart environments, smart agriculture, and smart health care systems.

3GPP has standardized designs to support IoT services-eMTC and NB-IoT, which may be deployed in huge numbers. Thus, lowering the cost of these UEs is one of a number of key enablers for implementation of IoT. Another enabler is reduced power consumption to extend the lifetime of the battery in many such devices. The latter of these may be useful as there are substantial number of use cases in which devices may be deployed deep inside buildings, and thereby use coverage enhancement in comparison to the defined LTE cell coverage footprint.

As noted above, both Release (Rel)-13 eMTC and NB-IoT UEs may operate in licensed spectrum. However, the scarcity of licensed spectrum in lower LTE frequency bands may result in insufficient bandwidth to supply for all UEs, leading to a reduction in data throughput. Thus, interest in the operation of LTE systems in unlicensed spectrum has been contemplated. Potential LTE operation in unlicensed spectrum includes, but is not limited to, Carrier Aggregation (CA) based on Licensed Assisted Access (LAA)/enhanced LAA (eLAA) systems, LTE operation in the unlicensed spectrum via dual connectivity (DC), and standalone LTE systems in the unlicensed spectrum. In the latter of these, called MulteFire, LTE-based technology may operate solely in unlicensed spectrum without use of an anchor in licensed spectrum.

To extend the benefits of LTE IoT designs into unlicensed spectrum, MulteFire 1.1 is expected to specify the design for Unlicensed-IoT (U-IoT or UIoT). U-IoT may refer to the operation of IoT devices in the unlicensed spectrum. Various embodiments discussed herein are related to U-IoT systems, and in particular, may be related to eMTC-based U-IoT designs. Similar approaches may be applied to NB-IoT-based U-IoT designs as well as eMTC-based U-IoT designs.

MulteFire and other unlicensed band techniques can be used in any unlicensed spectrum. Future MulteFire deployments are expected in the 5 GHz unlicensed band and potentially also in the 3.5 GHz shared band in the United States. In a MulteFire network, eNBs and/or access points (APs) communicate solely in an unlicensed radio frequency spectrum band. This is different from LAA/LWA and other systems in which a channel in a licensed (LTE) frequency acts as an anchor channel to pass essential information, such as control information, for example. Use of the unlicensed spectrum may impose transmission power limitations and protocols such as Clear Channel Assessment (CCA) and Listen-Before-Talk (LBT) transmission rules if the channel is occupied.

When using the unlicensed bands, eNBs and UEs may determine channel availability via energy detection before transmitting data on the channel. For example, the eNB or UE may determine that the channel is occupied through a predetermined amount of energy being present in the channel or via a change in a received signal strength indication (RSSI). The eNB or UE may detect the presence of a specific sequence, such as a preamble transmitted prior to a data transmission, that indicates use of the channel.

The unlicensed channel may be reserved using a reservation signal to prevent WiFi signals from initiating transmission until the next frame boundary event. Thus, the eNBs and UEs may contend for access to the unlicensed frequency band by performing CCA procedures, and transmitting during transmission opportunities (TxOPs).

In some embodiments, the unlicensed frequency band of interest is the 2.4 GHz band. For global availability, the design may abide by the regulations in different regions (e.g., the regulations given by Federal Communications Commission (FCC) in the United States and the regulations given by European Telecommunications Standards Institute (ETSI) in Europe). Based on these regulations, frequency hopping is more appropriate than other forms of modulation, due to more relaxed power spectrum density (PSD) limitations and co-existence with other unlicensed band technologies, such as Bluetooth and WiFi. Specifically, frequency hopping (intra- or inter-subframe) may have no PSD limit, while other wideband modulations may have a PSD limit of 10 dBm/MH z in regulations given by ETSI. A low PSD limit may result in more limited coverage for the eNB. Thus, U-IoT with frequency hopping is described below.

Some embodiments provide random access channel (RACH) procedure designs and RACH procedures for U-IoT. RACH procedures and procedure designs may include a RACH procedure with an anchor channel, the RACH physical channel, the RACH channel location and anchor channel design and signaling. Similarly, the IoT-U design for a sub-1 GHz band may include an anchor channel bandwidth of 180 KHz. This may be due to regulation constraints in China and the European Union (EU), for example.

Figure 7:
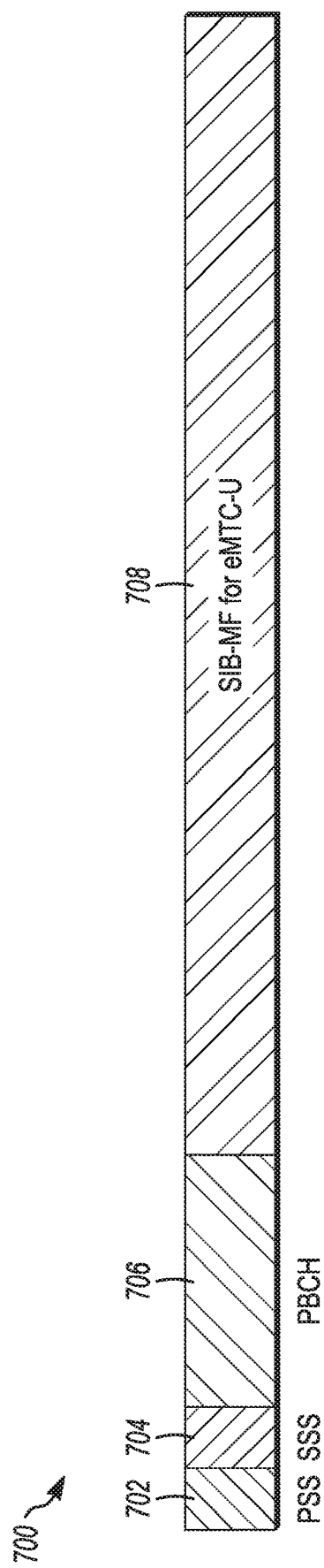
FIG. 7 illustrates an anchor channel in accordance with some embodiments.

FIG. 7 illustrates an anchor channel in accordance with some embodiments. The anchor channel 700 may contain a downlink (DL) transmission that has a 180 KHz for NB-IoT-U or 1.4 MHz bandwidth for eMTC-U. Although only one anchor channel is shown in FIG. 7, multiple anchor channels may exist. To permit faster UE initial search and reduce UE power consumption, a single anchor channel may be used to send the DRS/PBCH. The anchor channel can be predetermined (e.g., the central channel of the frequency range). The dwell time on anchor channel can be the same or shorter than that compared to other data channels to permit frequent return of the eNB to transmission on the anchor channel (or the UE to determine the next hopping sequence).

The dwell time of the anchor channel 700 may be, for example, 5 ms and may include various control signals in different slots or subframes (i.e., DL and UL control signals are transmitted using the resources of the anchor channel 700). These signals may include system information in a master information block (MIB) and a primary synchronization signal (PSS) 702 in a first slot and a secondary synchronization signal (SSS) 704 in a second slot. The PSS 702 and SSS 704 may be used by the UE to identify the cell using the cell ID, the current subframe number, slot boundary, and duplexing mode. The PSS 702 may be used for slot synchronization and carry one of 3 cell IDs in a group sequence; the SSS 704 may be used for frame synchronization and carry one of 170 unique cell identifiers so that 510 unique combinations of cell ID and cell identifier exist in the LTE system. PSS/SSS/PBCH symbols can also be interleaved within the same subframe, similar to MulteFire 1.0 wideband design, for a 1.4 MHz eMTC-U system.

Specifically, the PSS 702 and SSS 704 may be comprised of a sequence of length 62 symbols. The PSS may be constructed from a frequency-domain Zadoff-Chu (ZC) sequence of length 63. The UE may be able to obtain the physical layer cell ID and achieve slot synchronization after the detection of the PSS. The SSS sequences may be generated according to maximum length sequences (M-sequences), which can be created by cycling through every possible state of a shift register of length n. Detection of the PSS and SSS may enable time and frequency synchronization, provide the UE with the physical layer identity of the cell. In some embodiments, the PSS and SSS may occupy 6 RB. In other embodiments, the PSS, SSS and PBCH may occupy 1 RB, and use a narrowband-like design (NPSS/NSS/NPBCH). In NB-IoT, the first 3 OFDM symbols are left open for backward compatibility with LTE PDCCH transmission. The PSS and SSS may each be 11 symbols or 14 symbols in length, the latter formed by extending the length-11 cover code to a length-14 cover code. For NPBCH, the first 3 symbols are also used, rate matching into 14 symbols.

In addition, a physical broadcast channel (PBCH) signal 706 may be transmitted from the eNB to the UE. The PBCH signal 706 may contain the system frame number (SFN) and System Information Broadcast Anchor (SIB-A-MF) scheduling information, including the transport block size (TBS) and number of repetitions. If the PSS, SSS and PBCH are each 6 RB, the SIB-A-MF scheduling information may be eliminated, and the scheduling SIB-A-MF can be sent in an ePDCCH immediately after the PBCH transmission. If the SIB-A-MF is transmitted on a data channel, the PBCH signal 706 may contain the next hopping channel for frequency non-adaptive hopping or the hopping sequence, the next hopping channel and the dwell time for adaptive hopping. If the PBCH signal 706 does not contain next hopping channel for frequency non-adaptive hopping or the hopping sequence, a SIB-A-MF may instead be transmitted on the anchor channel following the PBCH signal 706. The control signals (the PSS, SSS and PBCH) may be transmitted on the predefined anchor channels. This may reduce the UE search complexity, which may be useful for a UE in idle mode or long eDRX. The PBCH signal 706 may extend, for example, over 8 subframes for a total of 112 symbols.

The anchor channel 700 may also contain an eMTC-U System SIB-A-MF transmission 708 (SIB-A-MF). The SIB-A-MF 708 may extend over 1 or more subframes, for example 2-3 subframes and be located in the subframe immediately succeeding that of the PBCH 706. The SIB-A-MF 708 may provide information to the UE the hopping sequence (channel whitelist), UL and DL transmissions, access and RACH information and dwell time of each data channel for frequency hopping. The dwell times for the data channels may be equal.

The SIB-A-MF 708 may indicate the total dwell time or the individual UL and DL durations of the dwell time. In some embodiments, when the anchor channel dwell time is small, the SIB-A-MF for eMTC-U may be transmitted in the data channel. In this case, the PBCH 706 may be used to indicate which channel is the next hopping channel when non-frequency adaptive hopping is used.

The hopping sequence can be derived by the UE from the eNB ID (Physical Cell Identifier or Cell Global Identity). A minimum of 15 hopping channels may be used. The maximum dwell time for each hop may be 400 ns. The return time, defined as the "with number of Max period within which a hop channel is reused" may be 4*channel dwell time*# of hopping channels.

The UE may derive the hopping channel and resource on which to transmit the RACH sequence. This information may be derived from the RACH resource configuration, the hopping sequence pattern and dwell time indicated by the SIB-A-MF 708. The UE may monitor for a Random Access Response (RAR) from the eNB during a RAR window that spans the current eNB hopping channel or the next hopping channel. The UE may periodically return to the anchor channel shown in FIG. 7, and in other embodiments herein, for a new hopping sequence, dwell times, etc . . . .

Figure 8:
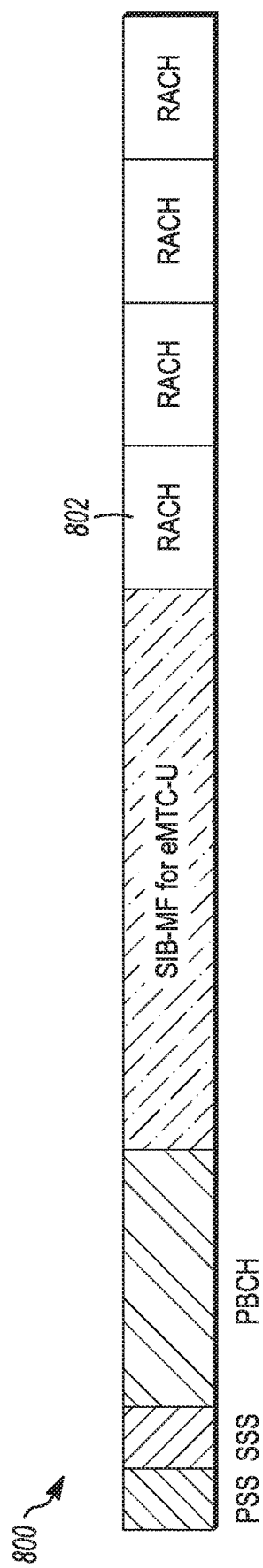
FIG. 8 illustrates another anchor channel in accordance with some embodiments.

FIG. 8 illustrates another anchor channel in accordance with some embodiments. The anchor channel 800 contains the same information as the anchor channel 700 in FIG. 7. In addition, the anchor channel 800 may contain one or more RACH resources 802 reserved for multiple RACH groups. In each RACH resource 802, the particular RACH group may transmit a RACH request. Thus, the RACH resource may be allocated on the anchor channel 800 after the downlink (DL) transmission. Thus, the anchor channel can include DL transmissions only (as in FIG. 7) or may include both UL and DL transmissions (as in FIG. 8). In the latter embodiment, the anchor channel may follow the same or different DL/UL configuration as data channels.

The RACH Request may be the first message in the RACH procedure. In general, a UE in the RACH group may synchronize to the network using the RACH procedure. The Physical Random Access Channel (PRACH) may be provided for initial access by the UE to the network when the UE is in the RRC idle state. The RACH procedure may also be used under other circumstances, such as RRC connection re-establishment or handover.

The RACH request may be transmitted by the UE over the entire frequency resources assigned to the anchor channel using the RACH resource 802. For example, the RACH request may be transmitted over 6 Resource blocks. The RACH request may contain a preamble index, which may be randomly selected based on the size of the RRC connection request (MSG 3 of the RACH procedure) from preamble information in SIB2.

The eNB, having received the RACH request may allocate a temporary Cell Radio Network Temporary Identifier (C-RNTI) for the UE. The temporary Cell RNTI may be transmitted to the UE in a RACH Response message (RAR-MSG 2) from the eNB. The RAR message may also contain the appropriate timing advance for the UE, determined by the eNB. In LTE embodiments, the RAR message may contain a UL grant for the UE to send the RRC connection request, where the UL grant may indicate whether frequency hopping is to be used as well as the resource block assignment. In some MF embodiments, frequency hopping may be indicated in the SIB-A-MF. The RAR message may further indicate the modulation and coding scheme and the power for the PUSCH to be used by the UE.

The randomly selected random access preamble may not enable unique identification of the UE, leaving the possibility that multiple UEs may attempt to initiate the random access procedure with the same preamble sequence on the same channel. A contention resolution phase may help to uniquely identify the UE that has been selected. The UE, having received the RAR message, may transmit the RRC connection request to the eNB as a contention resolution (MSG 3). Message 3 may be addressed towards a TMSI value or Random Number, and contains the temporary C-RNTI.

The eNB may respond to the RRC Connection Request with a RRC Connection Setup message. The RRC Connection Setup message is addressed with the Temporary C-RNTI of the UE. The message may also contain the Random Number to confirm that the RRC Connection Request is directed to the UE. The UE may, in response to the RRC Connection Request, acknowledge the RRC Connection Request with a Hybrid ARQ ack or an RRC Connection Setup Complete message.

FIG. 8 illustrates an embodiment of the anchor channel in which the RACH is transmitted in the anchor channel after the SIB-A-MF. In some embodiments, multiple anchor channels may be defined and RACH resource(s) may span multiple channels. In such embodiments, different RACH resources can be allocated on different anchor channels, which may be indicated through SIB-2. Thus, in some embodiments, the anchor channel may have multiple DL and UL transmissions, which enable MSG 1 to MSG 5 of the RACH transmissions to occur on the anchor channel.

Figure 9:
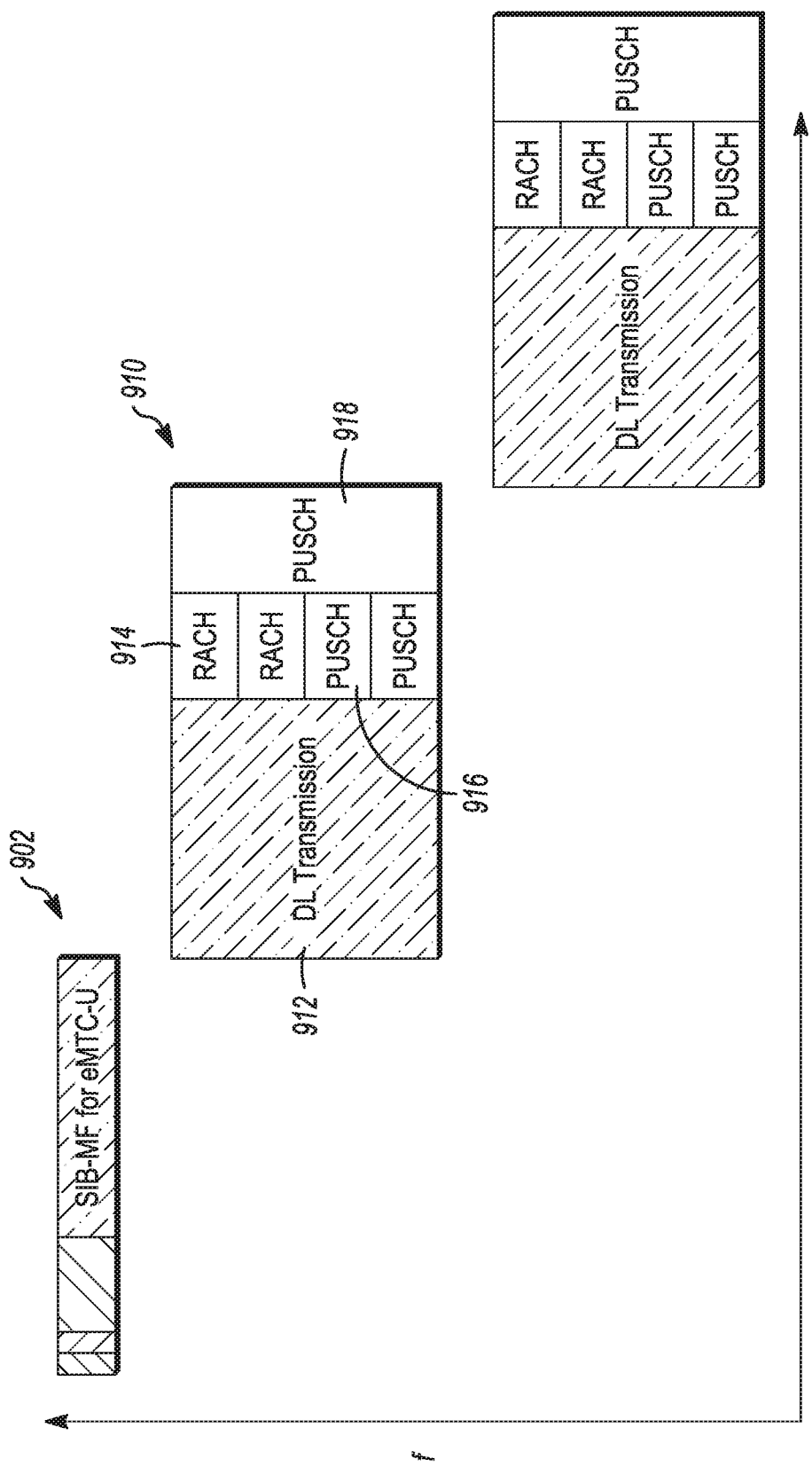
FIG. 9 illustrates transmissions in accordance with some embodiments.

In other embodiments, however, the RACH may be transmitted on a channel other than the anchor channel. FIG. 9 illustrates transmissions in accordance with some embodiments. In the embodiment shown in FIG. 9, the anchor channel 902 and one or more normal data channels 910 are shown. In some embodiments, the anchor channel 902 may contain DL control information and the data channels 910 may contain DL and UL data, but avoid DL control signals. In some embodiments, the anchor channel 902 may span 5 ms and the data channels 910 may each span 75 ms. These values may be based on the 3GPP standard. As in other embodiments, the various signals described herein may be encoded by the transmitting entity prior to transmission and decoded at the receiving entity after reception and prior to further processing.

The RACH resource(s) 914 may be allocated on one or more of the normal data channels 910. The channel hops and time/frequency resources of the normal data channels 910 may be indicated in the SIB-A-MF (or SIB-A-MF-IoT). The UE may decode the anchor channel 902 and extract the hopping pattern from the information contained therein. In some embodiments, the anchor channel 902 may not frequency hop; that is, all control communications may occur on the same channel. As above, in some embodiments, the dwell time for the anchor channel 902 may be less than that of the data channels 910.

When the 2.4 GHz channel is used for the transmissions shown in FIG. 9, the BW of the data channels 910 may be 180 KHz, 1.4 MHz, or 5 MHz depending on country and regulation requirements. The SIB-A-MF may indicate which set of channels among multiple sets of channels may be used for the hopping pattern. Thus, the hopping pattern may be limited to a set of channels. In some embodiments, 60 channels may be available across the BW of which 16 may be used by the hopping pattern. The 16 channels selected by the eNB may be adaptive (i.e., based on channel quality feedback to the eNB) or non-adaptive (predetermined). In the latter case, the non-adaptive channels may be periodically changed and indicated in different anchor channel transmissions.

As shown, each data channel 910 may contain both UL and DL transmissions. The DL transmission 912 may be a PDSCH for the UE. The UL transmission may contain a first section that may contain one or more RACH transmissions 914 and/or one or more PUSCH transmissions 916 (which are multiplexed) if the frequency resources used for each transmission are smaller than the data channel frequency resources, and a second section that is limited to PUSCH transmissions 918. The RACH(s) 914 can be multiplexed with Physical Uplink Shared Channel (PUSCH) transmissions 916. The RACH transmissions 914 and PUSCH transmissions 916, 918 may be from different UEs. In some embodiments, such as that shown, the BW of the first section may be portioned into multiple segments of equal BW, each of which may be a UL transmission from a different UE that are independent of each other. In some embodiments, the entire BW of the data channel 910 (e.g., 6 PRBs) may be occupied by a RACH transmission 914.

The RACH transmission 914 and PUSCH 918 transmission may be defined independently by the SIB-A-MF in the anchor channel 902 and each may be subject to different 3GPP regulations. Accordingly, although the PUSCH transmission 918 is shown as occurring after the RACH transmission 914, in other embodiments, the PUSCH transmission 918 may occur before or surround the RACH transmission 914.

Although not shown, a switching gap may be provided between the DL and UL sections of the data channel 910 and between adjacent data channels 910, which are subject to frequency hopping. The switching gap may be 2 symbols that occur at the beginning and end of the DL transmission 912. The initial switching gap (at the beginning of the DL transmission 912) may be used to compensate for retuning of the UE between channels; the terminal switching gap at the end of the DL transmission 912 may be used to compensate for switching between the transmit and receive chains.

Figure 10:
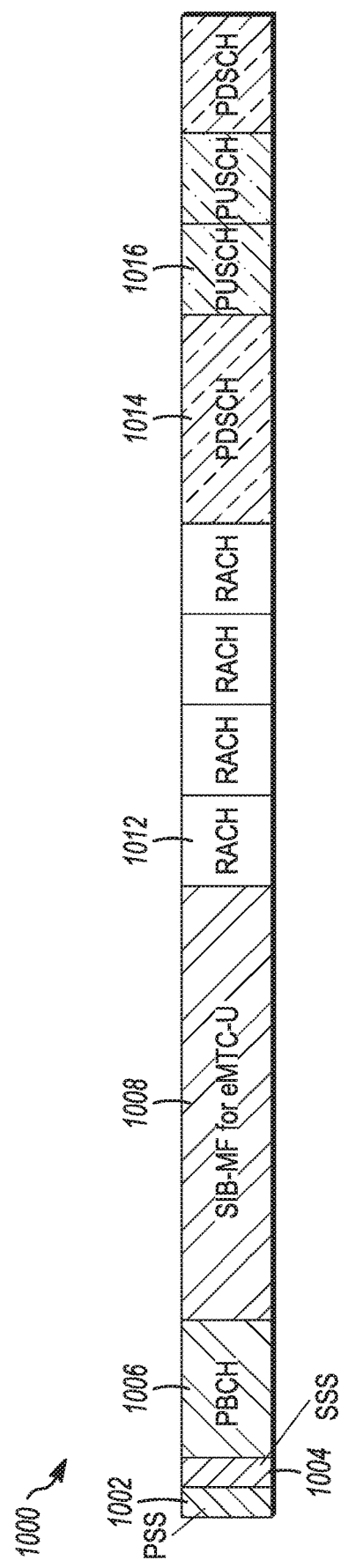
FIG. 10 illustrates another anchor channel in accordance with some embodiments.

In FIG. 9, the data channel 910 has a single DL transmission and multiple UL transmissions. In other embodiments, the anchor channel 902 and/or the data channel 910 may have multiple DL and UL transmissions. Accordingly, FIG. 10 illustrates an anchor channel in accordance with some embodiments. In FIG. 10, the anchor channel 1000 may provide the resources for the PSS 1002, SSS 1004, PBCH 1006 and SIB-A-MF 1008, similar to the anchor channels of FIGS. 8 and 9. In addition, the anchor channel 1000 may provide the resources for multiple RACH transmissions 1012, as well as one or more DL data transmissions (PDSCH) 1014 and one or more UL data transmissions (PUSCH) 1016.

As shown, the UL transmissions (RACH 1012 and PUSCH 1016) in the anchor channel 1000 may be separated by the PDSCH 1014. In other embodiments, the RACH 1012 and PUSCH 1016 may be adjacent or interleaved and the PDSCH 1014 may be adjacent to the UL transmissions. In further embodiments, the PDSCH 1014 may be interleaved with one or both sets of the UL transmissions (e.g., between RACHs 1012).

The multiple RACHs 1012 in the anchor channel 1000 may be associated with different UEs. Alternatively, multiple RACHs 1012 in the anchor channel 1000 may be associated with the same UE. This latter case may enable MSG 1 to MSG 5 of the RACH procedure transmissions to occur on the anchor channel 1000. In embodiments in which the anchor channel 1000 hops, each of MSG 1-5 may be transmitted within the same hop. In other embodiments, the MSG 1-5 can be distributed across multiple anchor channel hops.

Figure 11:
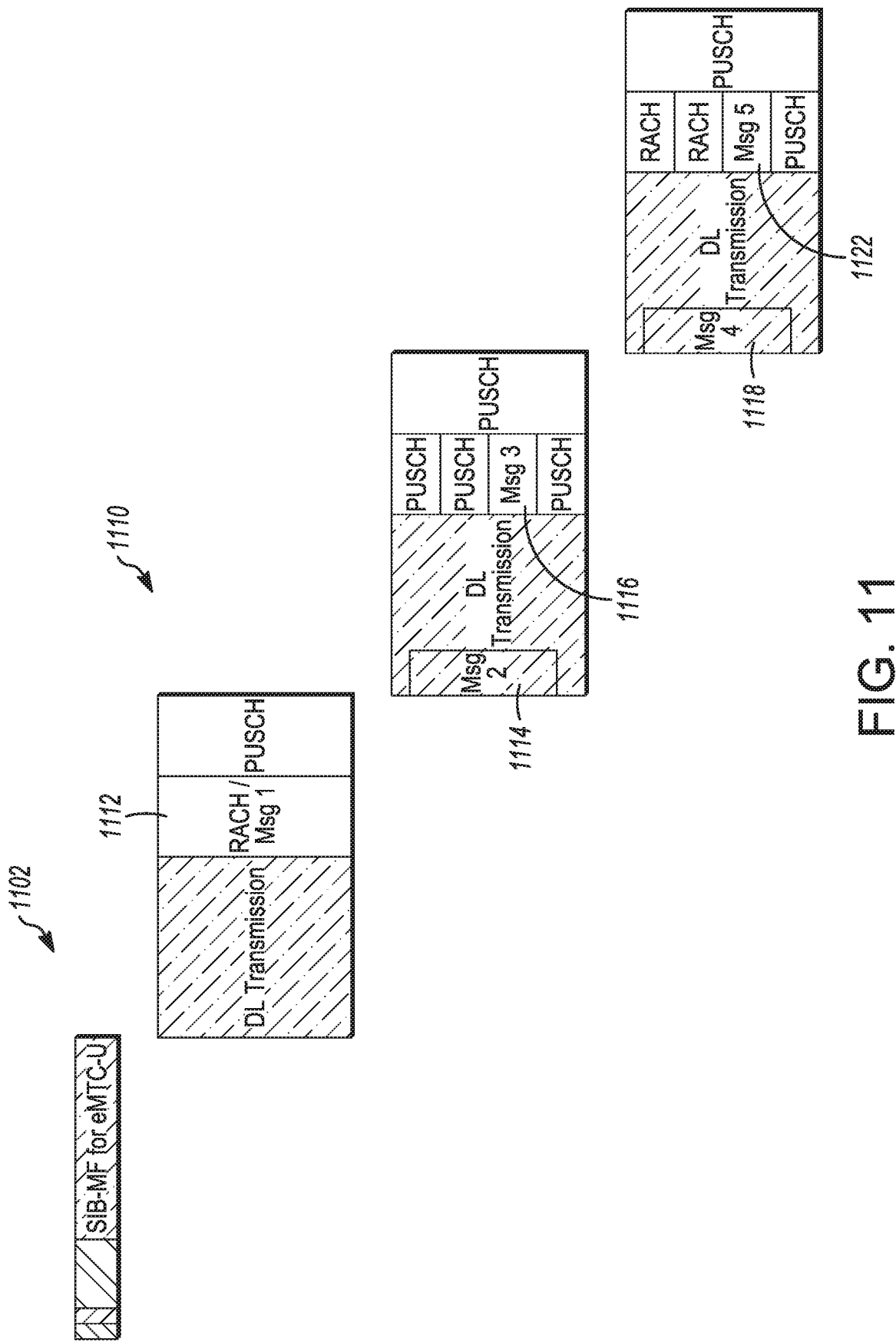
FIG. 11 illustrates transmissions in accordance with some embodiments.

FIG. 11 illustrates transmissions in accordance with some embodiments. In the embodiment shown in FIG. 11, the anchor channel 1102 and one or more normal data channels 1110 are shown. As above, the anchor channel 1102 may span 5 ms and the data channels 1110 may each span 75 ms. In the embodiment shown in FIG. 11, the RACH procedure may occur on different data channels. Similar to the previous embodiments, the RACH resources (1112-1122) may be indicated by the SIB-A-MF-IoT.

As shown, MSG 1 1112 may be transmitted on the RACH resources of the 1$^{st}$ hop. The RACH resources 1112 may, as shown, use the entire frequency resources of the data channel 1110 in the associated subframe(s) or may be frequency multiplexed with PUSCH resources. As indicated above, the RACH resources and PUSCH resources may be disposed differently than shown in FIG. 11, dependent, e.g., on limitations on the PUSCH resources set by the 3GPP standard.

The remaining messages may use resources in data channels after later hops. As shown, MSG 2-5 (DL transmission 1114, UL transmission 1116, DL transmission 1118, UL transmission 1122) may occur after different hops. Depending on frame structure configuration which is signaled in SIB-A-MF-IoT, each hop can have one or multiple DL transmission opportunities, and MSG 2-5 can be transmitted on the data channel of the same hop or different hops. In some embodiments, the RACH messages of the same RACH procedure may be transmitted in the minimum number of data channels, i.e., consecutive data channels 1110, 1114, 1116 after the anchor channel 1102.

Although shown as being transmitted after consecutive frequency hops (i.e., in consecutive data channels), the RACH transmissions of the same RACH procedure may be transmitted after non-consecutive frequency hops. In some embodiments, for example, MSG 2 may be transmitted after the third frequency hop (that is, the second data channel) shown in FIG. 1 (rather than after the second frequency hop/first frequency hop). Moreover, in some embodiments, each data channel may be limited to a single RACH transmission so that, for example, MSG 2 and 3 may be transmitted after different frequency hops rather than being transmitted after the same frequency hop.

In other embodiments, to reduce the latency associated with the RACH procedure, a 2-step RACH procedure may be supported. In the 2-step RACH procedure, MSG 1 and 3 may be transmitted together and MSG 2 and 4 may be transmitted together. The detailed physical (PHY) structure to support MSG 1 and 3 transmission is omitted here for sake of brevity.

In some embodiments, the RACH physical channel may occupy 1 resource block (RB) and 5 subframes. Within each subframe, subcarrier spacing may be ¹⁄₁₂ of 15 KHz (similar to LTE RACH format 0). The frequency domain mapping may use a 144−24=120 Zadoff-Chu (ZC) sequence, where the guard tone on each side may be 12 if the UL BW is 1.4 MHz or greater. The $T_{seq}$ length may be 0.8 ms, and a padding cyclic prefix (CP) may be applied to meet 1 ms. 5 repetitions may be applied over 5 subframes, where each repetition can contain the CP or not, as needed. In some embodiments, a long CP can be concatenated with five repeated RACH sequences. The coverage of the RACH signaling may extend to 14 km, similar to LTE RACH format 0. An Orthogonal Cover Code (OCC) 5 may be used across different subframes with a Cyclic Delay Diversity (CDD)/root sequence index within each subframe to create the 64 RACH sequences per cell. The RACH MSG 1 configuration, including channel hops, time/frequency location and sequence root index. CDD and OCC information can be configured in the SIB-A-MF (e.g., the SIB-A-MF-IoT).

In other embodiments, a 7.5 KHz Service Code (SC) can be used, similar to LTE RACH format 4. A total of 20 tones within one RB, with 4 guard tones may be used. A ZC sequence length 20 may be used to generate a RACH sequence of 2 Orthogonal Frequency Division Multiplex (OFDM) symbol long with CP. Each subframe may contain 7× repetitions, and 5× repetitions may be used across 5 subframes to match a 5 ms UL transmission duration for UL non-adaptive frequency hopping (i.e., the UE may not adapt the hop sequence based on occupation at the channel to be hopped to).

In another embodiment, a 15 KHz subcarrier spacing can be used for a small cell design, similar to MF1.0. This assumes that the CP length is long enough for the round trip time (RTT) and channel delay spread. A total of 12 tones may be used within one RB, with a ZC sequence length of 12, similar to a DMRS sequence. In this case, 14× repetitions with an OCC may be used within one subframe to generate a RACH sequence within one subframe.

In some embodiments, the RACH physical channel may occupy 1 3.75 KHz single carrier (SC) tone. In this case, the Narrowband Random Access Channel (NPRACH or nRACH) design may be reused. To match a 5 ms UL non-adaptive frequency hopping limitation, the PRACH symbols per symbol group may be reduced from 5 to 4 symbols, and a CP length of 183.2 microseconds (us) per symbol group. With 4 symbol group and 2 tier of hopping, a total of 5 ms transmission may be used.

In other embodiments, the same CP as the nPRACH may be used. When a long CP of 266.7 µs is used, the number of symbols per symbol group may be reduced from 5 to 3. With 4 symbol group-based 2 level hopping, the total time is 266.7 µs*4*4=4.27 ms. With a short CP, the number of symbols per symbol group may be reduced to 4, increasing the total transmission to (266.7*4+66.7)*4=4.534 ms. The unused time may be provided as guard time. This may allow FDM together with 3.75 KHz single tone PUSCH transmission, or 15 KHz multi-tone PUSCH transmission with a guard band.

In some embodiments, the RACH physical channel may occupy one or more 15 KHz SC tones. If a sub-PRB-based PUSCH is supported and multiplexing the sub-PRB-based PUSCH and the PRACH is desired, a PRACH designed with a 1.25 KHz subcarrier spacing and multiple 15 KHz tones may be supported. Repetition over 5 subframes may be adopted to extend the geographic range. An OCC 5 across different subframes and cdd/root sequence index within each subframe can be used together to create the 64 RACH sequences per cell. This may allow the 15 KHz multi-tone PUSCH to have a guard band.

The RBs used for the PRACH may depend on the geographic location. That is, different countries may have different regulations. To meet these, a PRACH format with 3 RB or 6 RB can be defined. In some embodiments, a (previously) single RB can be extended to more than one RB, e.g. 3 RBs or 6 RBs. A straightforward way of generating a wider PRACH format is to use an extended length ZC sequence. For example, with 1.25 KHz SC, 3 RB, 144*3−24=a 408 ZC sequence may be used. Alternatively, the single RB PRACH can be extended to more than one RB by applying the OCC in the frequency domain. One special case is OCC all equal to 1, which is referred to as repetition. Or, for the 6 RBs case, the legacy LTE system may be reused, when the subcarrier spacing is equal to 1.25 kHz.

The subframes used for the PRACH may vary in different embodiments. The 15 KHz, 1.25 KHz and 3.75 KHz PRACH structure can also be applicable to 1, 2, 3, 4 or 5 subframes. The number of subframes can be configured by the eNB. In some embodiments, the subframe number may be configured via a bit map. Alternatively, an indicator may be used to inform the starting subframe and the number of subframes for the PRACH transmission. Sequences that may use a different root, or RB extension in the frequency domain by multiplying OCC can be utilized to generate 64 PRACH candidates. The index for the PRACH configuration may be different for different numbers of subframes, and can have a nesting structure. For instance, an $I_{PRACH}$ ranging from 1 to 64 may be used for PRACH parameter derivation within one subframe. An $I_{PRACH}$ ranging from 1~64*2 may be used for PRACH parameter derivation, while $I_{PRACH}$ div 2 for OCC, and $I_{PRACH}$ mod 64 for within one subframe of a PRACH configuration and so on. Alternatively, the index for PRACH may be the same for different numbers of subframe, with each index corresponding to a pre-defined table.

Thus, as above, in some embodiments, the RACH physical channel may be 5 ms and/or may occupy 1 RB. In some embodiments, the RACH physical channel may have a 1.25 kHz subcarrier spacing, and a resulting sequence length of 800 ms. In some embodiments, a ZC sequence of length 120 may be used to generate the RACH physical channel. In some embodiments, the 800 ms sequence may be repeated with a CP to a total length of 5 ms. In some embodiments, different root sequences, OCCs and CDDs can be used to create different RACH candidates. In some embodiments, the RACH physical channel can be a single tone with a 3.75 KHz subcarrier spacing, based on nRACH design. In this case, the RACH symbol group may be modified to fit into the 5 ms UL duration, for example, the RACH symbol group can use a different CP length to match the 5 ms UL duration or the RACH symbol group can reduce the number of symbols while using the same CP duration as nRACH. In some embodiments, the RACH physical channel can employ multiple tones with a 3.75 KHz subcarrier spacing.

EXAMPLES

Example 1 is an apparatus of an enhanced Machine Type Communication (eMTC) user equipment (UE), the apparatus comprising: processing circuitry arranged to: decode control information from an evolved NodeB (eNB) on an anchor channel operating in an unlicensed band, the control information comprising a master information block (MIB) and System Information Broadcast Anchor (SIB-A-MF) that provides a Random Access Channel (RACH) resource configuration for a RACH procedure and a dwell time for data channels in the unlicensed band; wherein a hopping sequence of the data channels is derived from an identifier of the eNB or received in the control information; determine, from the RACH resource configuration, RACH resources of at least one of the anchor channel or data channels on which to transmit uplink (UL) RACH messages and on which to monitor for downlink (DL) RACH messages of the RACH procedure; and encode the UL RACH messages for transmission to the eNB and decode the DL RACH messages received from the eNB on the RACH resources as part of the RACH procedure; and a memory configured to store the RACH resource configuration for the eMTC UE.

In Example 2, the subject matter of Example 1 includes, wherein the processing circuitry is further arranged to: encode different UL RACH messages of the RACH procedure for transmission to the eNB on different data channels.

In Example 3, the subject matter of Example 2 includes, wherein the processing circuitry is further arranged to: decode different DL RACH messages of the RACH procedure on the different data channels.

In Example 4, the subject matter of Example 3 includes, wherein: at least one of the UL RACH messages and at least one of the DL RACH messages of the RACH procedure are received in a same data channel.

In Example 5, the subject matter of Examples 3-4 includes, wherein: at least one set of consecutive UL and DL RACH messages of the RACH procedure are received in consecutive data channels.

In Example 6, the subject matter of Example 5 includes, wherein: the UL and DL RACH messages of the RACH procedure are received in the anchor channel and consecutive data channels to minimize a number of data channels used.

In Example 7, the subject matter of Examples 1-6 includes, wherein the processing circuitry is further arranged to: encode, for transmission on separate UL resources of one of the data channels, one of the UL RACH messages and a Physical Uplink Shared Channel (PUSCH) message.

In Example 8, the subject matter of Example 7 includes, wherein: a size of both the one of the UL RACH messages and the PUSCH message is 6 resource blocks.

In Example 9, the subject matter of Examples 1-8 includes, wherein the processing circuitry is further arranged to: encode, for transmission to the eNB on RACH resources of the anchor channel, one of the UL RACH messages.

In Example 10, the subject matter of Example 9 includes, wherein: the RACH resources of the anchor channel immediately succeed the SIB-A-MF.

In Example 11, the subject matter of Example 10 includes, wherein the processing circuitry is further arranged to: decode a physical broadcast channel (PBCH) signal immediately prior to the SIB-A-MF, the PBCH containing a system frame number (SFN) and SIB-A-MF scheduling information, including a transport block size (TBS) and number of repetitions of the SIB-A-MF.

In Example 12, the subject matter of Examples 1-11 includes, wherein: a dwell time of the anchor channel is less than a dwell time of the data channels.

In Example 13, the subject matter of Examples 1-12 includes, wherein: the anchor channel comprises the UL and DL RACH resources for the RACH procedure.

In Example 14, the subject matter of Examples 1-13 includes, wherein: a single data channel comprises the UL and DL RACH resources for the RACH procedure.

In Example 15, the subject matter of Examples 1-14 includes, wherein the processing circuitry is further arranged to: generate an UL RACH transmission of multiple resource blocks through use of an extended length Zadoff-Chu sequence and 3.75 KHz subcarrier spacing.

In Example 16, the subject matter of Examples 1-15 includes, wherein: the processing circuitry comprises a baseband processor configured to encode transmissions to, and decode transmissions from, the eNB.

Example 17 is an apparatus of a next generation evolved NodeB (gNB), the apparatus comprising: processing circuitry arranged to: encode, for transmission to an enhanced Machine Type Communication (eMTC) user equipment (UE), control information on an anchor channel operating in an unlicensed band, the control information comprising: a Primary Synchronization Signal (PSS) and Secondary Synchronization Signal (SSS), a physical broadcast channel (PBCH) signal after the PSS and SSS, the PBCH comprising a system frame number (SFN) and System Information Broadcast Anchor (SIB-A-MF) scheduling information, including a transport block size (TBS) and number of repetitions of the SIB-A-MF, and a SIB-A-MF immediately after the PBCH, the SIB-A-MF comprising a Random Access Channel (RACH) resource configuration for a RACH procedure and dwell time of data channels in the unlicensed band, the anchor channel further comprising an uplink (UL) RACH resource for reception of a RACH Request by the UE; decode UL RACH messages of the RACH procedure from the UE on UL RACH resources of at least one of the data channels; and encode downlink (DL) RACH messages for transmission to the UE in response to the UL RACH messages on DL RACH resources of the at least one of the data channels; and a memory configured to store the RACH resource configuration.

In Example 18, the subject matter of Example 17 includes, wherein the processing circuitry is further arranged to: decode different UL RACH messages of the RACH procedure on multiple data channels of the at least one of the data channels; and encode different DL RACH messages of the RACH procedure on at least one of the multiple data channels.

In Example 19, the subject matter of Example 18 includes, wherein: the multiple data channels are consecutive.

In Example 20, the subject matter of Examples 17-19 includes, wherein: the dwell time of the data channels is longer than a dwell time of the anchor channel.

In Example 21, the subject matter of Examples 17-20 includes, wherein the processing circuitry is further arranged to: decode one of the UL RACH messages and a Physical Uplink Shared Channel (PUSCH) message on at least one of the data channels.

In Example 22, the subject matter of Example 21 includes, wherein: the one of the UL RACH messages and the PUSCH message overlap in frequency but not time.

In Example 23, the subject matter of Examples 17-22 includes, wherein: a RACH physical channel occupies 1 resource block and multiple subframes, within each subframe, a subcarrier spacing is 1.25 KHz, a Zadoff-Chu sequence of length 120, with 12 guard tones on each side, is used to generate at least one of the UL RACH messages, and the at least one of the UL RACH messages are repeated a plurality of times across the subframes.

In Example 24, the subject matter of Examples 17-23 includes, wherein: a RACH physical channel occupies 1 resource block and multiple subframes, within each subframe, a subcarrier spacing is 7.5 KHz, a Zadoff-Chu sequence of length 20, with 4 guard tones on each side, is used to generate at least one of the UL RACH messages, and the at least one of the UL RACH messages are repeated a first plurality of times within each subframe and a second plurality of times across the subframes.

In Example 25, the subject matter of Examples 17-24 includes, wherein: a RACH physical channel occupies 1 resource block within a subframe, within each subframe, a subcarrier spacing is 15 KHz, a Zadoff-Chu sequence of length 12 is used to generate at least one of the UL RACH messages, and the at least one of the UL RACH messages are repeated a plurality of times within the subframe.

Example 26 is a computer-readable storage medium that stores instructions for execution by one or more processors of an enhanced Machine Type Communication (eMTC) user equipment (UE), the one or more processors to configure the UE to, when the instructions are executed: receive control information from an evolved NodeB (eNB) on an anchor channel operating in an unlicensed band, the control information comprising: a physical broadcast channel (PBCH) signal comprising a system frame number (SFN) and System Information Broadcast Anchor (SIB-A-MF) scheduling information, and a SIB-A-MF after the PBCH, the SIB-A-MF comprising a Random Access Channel (RACH) resource configuration for a RACH procedure and dwell time of data channels in the unlicensed band, the dwell time of the data channels larger than a dwell time of the anchor channel, the anchor channel further comprising an uplink (UL) RACH resource for transmission of a RACH Request by the UE; and transmit UL RACH messages of the RACH procedure to the eNB on UL resources indicated by the SIB-A-MF and receive downlink (DL) RACH messages from the eNB on DL RACH resources of the RACH procedure indicated by the SIB-A-MF.

In Example 27, the subject matter of Example 26 includes, wherein the instructions, when executed, further configure the UE to: transmit different UL RACH messages of the RACH procedure on different data channels, and receive different DL RACH messages of the RACH procedure on the different data channels, wherein the RACH resources of at least one of the UL RACH messages and at least one of the DL RACH messages of the RACH procedure are contained in a same data channel.

In Example 28, the subject matter of Example 27 includes, wherein: the RACH resources for at least one set of consecutive UL and DL RACH messages of the RACH procedure are contained in consecutive data channels.

In Example 29, the subject matter of Examples 26-28 includes, wherein the instructions, when executed, further configure the UE to: transmit at least one of the UL RACH messages and at least one Physical Uplink Shared Channel (PUSCH) message on one of the data channels.

Example 30 is at least one machine-readable medium including instructions that, when executed by processing circuitry, cause the processing circuitry to perform operations to implement of any of Examples 1-29.

Example 31 is an apparatus comprising means to implement of any of Examples 1-29.

Example 32 is a system to implement of any of Examples 1-29.

Example 33 is a method to implement of any of Examples 1-29.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus of an enhanced Machine Type Communication (eMTC) user equipment (UE), the apparatus comprising:
    processing circuitry arranged to:
        decode control information from an evolved NodeB (eNB) on an anchor channel operating in an unlicensed band, the control information comprising a master information block (MIB) and System Information Broadcast Anchor (SIB-A-Mt) that provides a Random Access Channel (RACH) resource configuration for a RACH procedure and a dwell time for data channels in the unlicensed band;
        wherein a hopping sequence of the data channels is derived from an identifier of the eNB or received in the control information;
        determine, from the RACH resource configuration, RACH resources of at least one of the anchor channel or data channels on which to transmit uplink (UL) RACH messages and on which to monitor for downlink (DL) RACH messages of the RACH procedure; and
        encode the UL RACH messages for transmission to the eNB and decode the DL RACH messages received from the eNB on the RACH resources as part of the RACH procedure; and
    a memory configured to store the RACH resource configuration for the eMTC UE.

2. The apparatus of claim 1, wherein the processing circuitry is further arranged to:
    encode different UL RACH messages of the RACH procedure for transmission to the eNB on different data channels.

3. The apparatus of claim 2, wherein the processing circuitry is further arranged to:
    decode different DL RACH messages of the RACH procedure on the different data channels.

4. The apparatus of claim 3, wherein:
    at least one of the UL RACH messages and at least one of the DL RACH messages of the RACH procedure are received in a same data channel.

5. The apparatus of claim 3, wherein:
    at least one set of consecutive UL and DL RACH messages of the RACH procedure are received in consecutive data channels.

6. The apparatus of claim 5, wherein:
    the UL and DL RACH messages of the RACH procedure are received in the anchor channel and consecutive data channels to minimize a number of data channels used.

7. The apparatus of claim 1, wherein the processing circuitry is further arranged to:
    encode, for transmission on separate UL resources of one of the data channels, one of the UL RACH messages and a Physical Uplink Shared Channel (PUSCH) message.

8. The apparatus of claim 7, wherein:
    a size of both the one of the UL RACH messages and the PUSCH message is 6 resource blocks.

9. The apparatus of claim 1, wherein the processing circuitry is further arranged to:
    encode, for transmission to the eNB on RACH resources of the anchor channel, one of the UL RACH messages.

10. The apparatus of claim 9, wherein:
    the RACH resources of the anchor channel immediately succeed the SIB-A-W.

11. The apparatus of claim 10, wherein the processing circuitry is further arranged to:
    decode a physical broadcast channel (PBCH) signal immediately prior to the SIB-A-MF, the PBCH containing a system frame number (SFN) and SIB-A-MF scheduling information, including a transport block size (TBS) and number of repetitions of the SIB-A-W.

12. The apparatus of claim 1, wherein:
    a dwell time of the anchor channel is less than a dwell time of the data channels.

13. The apparatus of claim 1, wherein:
    the anchor channel comprises the UL and DL RACH resources for the RACH procedure.

14. The apparatus of claim 1, wherein:
    a single data channel comprises the UL and DL RACH resources for the RACH procedure.

15. The apparatus of claim 1, wherein the processing circuitry is further arranged to:
    generate an UL RACH transmission of multiple resource blocks through use of an extended length Zadoff-Chu sequence and 3.75 KHz subcarrier spacing.

16. The apparatus of claim 1, wherein:
    the processing circuitry comprises a baseband processor configured to encode transmissions to, and decode transmissions from, the eNB.

17. An apparatus of a next generation evolved NodeB (gNB), the apparatus comprising:
    processing circuitry arranged to:
        encode, for transmission to an enhanced Machine Type Communication (eMTC) user equipment (UE), control information on an anchor channel operating in an unlicensed band, the control information comprising:
            a Primary Synchronization Signal (PSS) and Secondary Synchronization Signal (SSS),
            a physical broadcast channel (PBCH) signal after the PSS and SSS, the PBCH comprising a system frame number (SFN) and System Information Broadcast Anchor (SIB-A-MF) scheduling information, including a transport block size (TBS) and number of repetitions of the SIB-A-MF, and
            a SIB-A-MF immediately after the PBCH, the SIB-A-MF comprising a Random Access Channel (RACH) resource configuration for a RACH procedure and dwell time of data channels in the unlicensed band, the anchor channel further comprising an uplink (UL) RACH resource for reception of a RACH Request by the UE;

decode UL RACH messages of the RACH procedure from the UE on UL RACH resources of at least one of the data channels; and encode downlink (DL) RACH messages for transmission to the UE in response to the UL RACH messages on DL RACH resources of the at least one of the data channels; and a memory configured to store the RACH resource configuration.

18. The apparatus of claim 17, wherein:

a RACH physical channel occupies 1 resource block and multiple subframes, and one of:

within each subframe, a subcarrier spacing is 1.25 KHz, a Zadoff-Chu sequence of length 120, with 12 guard tones on each side, is used to generate at least one of the UL RACH messages, and the at least one of the UL RACH messages are repeated a plurality of times across the subframes, within each subframe, a subcarrier spacing is 7.5 KHz, a Zadoff-Chu sequence of length 20, with 4 guard tones on each side, is used to generate at least one of the UL RACH messages, and the at least one of the UL RACH messages are repeated a first plurality of times within each subframe and a second plurality of times across the subframes, or within each subframe, a subcarrier spacing is 15 KHz, a Zadoff-Chu sequence of length 12 is used to generate at least one of the UL RACH messages, and the at least one of the UL RACH messages are repeated a plurality of times within the subframe.

19. A non-transitory computer-readable storage medium that stores instructions for execution by one or more processors of an enhanced Machine Type Communication (eMTC) user equipment (UE), the one or more processors to configure the UE to, when the instructions are executed:

receive control information from an evolved NodeB (eNB) on an anchor channel operating in an unlicensed band, the control information comprising:

a physical broadcast channel (PBCH) signal comprising a system frame number (SFN) and System Information Broadcast Anchor (SIB-A-MF) scheduling information, and a SIB-A-W after the PBCH, the SIB-A-W comprising a Random Access Channel (RACH) resource configuration for a RACH procedure and dwell time of data channels in the unlicensed band, the dwell time of the data channels larger than a dwell time of the anchor channel, the anchor channel further comprising an uplink (UL) RACH resource for transmission of a RACH Request by the UE; and transmit UL RACH messages of the RACH procedure to the eNB on UL resources indicated by the SIB-A-W and receive downlink (DL) RACH messages from the eNB on DL RACH resources of the RACH procedure indicated by the SIB-A-W.

20. The medium of claim 19 wherein the instructions, when executed, further configure the UE to:

transmit different UL RACH messages of the RACH procedure on different data channels, and receive different DL RACH messages of the RACH procedure on the different data channels, wherein the RACH resources of at least one of the UL RACH messages and at least one of the DL RACH messages of the RACH procedure are contained in a same data channel.

* * * * *